(12) United States Patent
Vaidya et al.

(10) Patent No.: US 11,851,625 B2
(45) Date of Patent: Dec. 26, 2023

(54) RESERVOIR MANAGEMENT BY CONTROLLING ACID GAS BUILD-UP IN RESERVOIR BY PARTIAL CO2 REMOVAL PROCESSES

(71) Applicants: Saudi Arabian Oil Company, Dhahran (SA); Membrane Technology and Research, Inc, Newark, CA (US)

(72) Inventors: Milind Vaidya, Dhahran (SA); Sebastien Duval, Dhahran (SA); Feras Hamad, Dhahran (SA); Ghulam Shabbir, Dhahran (SA); Nasser Al-Aslai, Dhahran (SA); Ahmad Bahamdan, Dhahran (SA); Richard Baker, Newark, CA (US); Tim Merkel, Newark, CA (US); Kaaeid Lokhandwala, Newark, CA (US)

(73) Assignee: SAUDI ARABIAN OIL COMPANY

( * ) Notice: Subject to any disclaimer, the term of this patent is extended or adjusted under 35 U.S.C. 154(b) by 169 days.

(21) Appl. No.: 17/326,083

(22) Filed: May 20, 2021

(65) Prior Publication Data
US 2022/0380693 A1     Dec. 1, 2022

(51) Int. Cl.
*C10L 3/10*     (2006.01)
*C09K 8/594*    (2006.01)
(Continued)

(52) U.S. Cl.
CPC ........... *C10L 3/103* (2013.01); *B01D 53/228* (2013.01); *B01D 53/526* (2013.01); *B01D 53/62* (2013.01);
(Continued)

(58) Field of Classification Search
None
See application file for complete search history.

(56) References Cited

U.S. PATENT DOCUMENTS

| 3,896,215 A | 7/1975 | Bratzler et al. |
| 4,529,411 A | 7/1985 | Goddin, Jr. et al. |

(Continued)

FOREIGN PATENT DOCUMENTS

| WO | 2011124326 A1 | 10/2011 |
| WO | 2019141909 A1 | 7/2019 |

OTHER PUBLICATIONS

Koike et al., "Synthesis and Characterization of Copolymers of Perfluoro(2-methylene-4,5-dimethyl-1,3-dioxolane) and Perfluoro(2-methylene-1,3-dioxolane)", Journal of Fluorine Chemistry 156, 2013, p. 198-202.

(Continued)

*Primary Examiner* — Daniel Berns
(74) *Attorney, Agent, or Firm* — Bracewell LLP; Constance Gall Rhebergen

(57) ABSTRACT

Methods are provided for reducing the quantity of acid gas reinjected into a reservoir by partial $CO_2$ removal processes. The methods include acid gas removal, acid gas enrichment, generation of a $CO_2$ rich stream and an $H_2S$ rich stream, and reinjection of the $H_2S$ rich stream into the reservoir. The acid gas enrichment can be performed by a solvent-based acid gas enrichment unit, a membrane-based acid gas enrichment unit, or a combination of a solvent-based acid gas enrichment unit and membrane-based acid gas enrichment unit. The system includes an acid gas removal unit, one or more acid gas enrichment units, and an acid gas reinjection compressor. The acid gas enrichment unit can be a solvent-based acid gas enrichment unit, a membrane-based acid gas enrichment unit, or a solvent-based acid gas enrichment unit and a membrane-based acid gas enrichment unit.

37 Claims, 12 Drawing Sheets

(51) Int. Cl.
  *B01D 53/22* (2006.01)
  *B01D 53/52* (2006.01)
  *B01D 53/62* (2006.01)
  *B01D 71/52* (2006.01)

(52) U.S. Cl.
  CPC .............. *B01D 71/52* (2013.01); *C09K 8/594* (2013.01); *C10L 3/104* (2013.01); *B01D 2256/24* (2013.01); *B01D 2257/304* (2013.01); *B01D 2257/504* (2013.01); *B01D 2325/20* (2013.01); *C10L 2290/02* (2013.01); *C10L 2290/10* (2013.01); *C10L 2290/46* (2013.01); *C10L 2290/541* (2013.01); *C10L 2290/548* (2013.01)

(56) References Cited

U.S. PATENT DOCUMENTS

| | | |
|---|---|---|
| 5,407,466 A | 4/1995 | Lokhandwala et al. |
| 5,556,449 A | 9/1996 | Baker et al. |
| 5,558,698 A | 9/1996 | Baker et al. |
| 6,387,159 B1 | 5/2002 | Butwell et al. |
| 6,508,863 B1 | 1/2003 | Byrne et al. |
| 6,648,944 B1 | 11/2003 | Baker et al. |
| 7,083,662 B2 | 8/2006 | Xu et al. |
| 7,147,691 B2 | 12/2006 | Palmer |
| 8,828,121 B1 | 9/2014 | He et al. |
| 2010/0310439 A1 | 12/2010 | Brok et al. |
| 2012/0085973 A1 | 4/2012 | Juengst et al. |
| 2013/0319231 A1 | 12/2013 | Jamal et al. |
| 2019/0338207 A1* | 11/2019 | Allam .................... C10L 3/103 |

OTHER PUBLICATIONS

Koike et al., "Synthesis and Radical Polymerization of Perfluoro-2-methylene-1,3-dioxolanes", Macromolecules 38, 2005, pp. 9466-9473.

Ohandwala et al., "Membrane Separation of Nitrogen from Natural Gas: A Case Study from Membrane Synthesis to Commercial Deployment", Journal of Membrane Science 346, 2010, pp. 270-279.

Merkel et al., "Comparison of Hydrogen Sulfide Transport Properties in Fluorinated and Nonfluorinated Polymers", Macromolecules 39, 2006, pp. 7591-7600.

Merkel et.al. "High-performance Perfluorodioxolane Copolymer Membranes for Gas Separation with Tailored Selectivity Enhancement", Journal Materials Chemistry A, 2018, 6, 652-658.

Mikes et al., "Characterization and Properties of Semicrystalline and Amorphous Perfluoropolymer: poly(per-fluoro-2-methylene-1,3-dioxolane)", Polym.Adv.Technol. 22, 2011, pp. 1272-1277.

Okamoto et al., "Synthesis and Properties of Amorphous Perfluorinated Polymers", Chemistry Today, vol. 27, No. 4, 2009, pp. 46-48.

Orme et al., "Mixed Gas Hydrogen Sulfide Permeability and Separation Using Supported Polyphosphazines Membranes", Journal of Membrane Science 253, 2005, pp. 243-249.

Perry et al., "Better Acid Gas Enrichment", ExxonMobil Research and Engineering Company, Flexsorb Solvents, Sulphur 326, Jan.-Feb. 2010, pp. 38-42.

Rezakazemi et al., "Hybrid Systems: Combining Membrane and Absorption Technologies Leads to More Efficient Acid Gasses (CO2 and H2S) Removal from Natural Gas", Journal of CO2 Utilization 18, 2017, pp. 362-369.

* cited by examiner

RESERVOIR MANAGEMENT BY CONTROLLING ACID GAS BUILD-UP IN RESERVOIR BY PARTIAL CO2 REMOVAL PROCESSES

NAMES OF THE PARTIES TO A JOINT RESEARCH AGREEMENT

This disclosure relates to technology developed pursuant to a joint research agreement between Membrane Technology and Research, Inc., formed under the laws of the State of California, USA, having an address at 39630 Eureka Drive, Newark, CA, 94560; and Saudi Aramco Technologies Company, a limited liability company organized under the law of the Kingdom of Saudi Arabia, whose principal office is located in Dhahran, Saudi Arabia.

FIELD

This disclosure relates to methods and systems for enriching an acid gas stream. More specifically, this disclosure relates to removing $CO_2$ from an acid gas stream to generate an enriched acid gas stream which can then be reinjected into a reservoir.

BACKGROUND

Raw natural gas contains many components other than hydrocarbons which degrade the quality of the gas. For example, many sources of natural gas contain acid gases, including carbon dioxide ($CO_2$) and hydrogen sulfide ($H_2S$). Natural gas is often treated with an acid gas removal process to remove acid gas and obtain marketable natural gas or to recover natural gas liquids (NGLs). Absorption processes or membrane separation can be used for acid gas removal.

The acid gas recovered from the natural gas can be destroyed or separated into components. If the $CO_2$ removed from the acid gas is of acceptable purity, the $CO_2$ can be released directly to atmosphere, used locally, or reinjected into a reservoir for enhanced oil recovery operations. However, often the $CO_2$ contains undesirable levels of $H_2S$, requiring the gas to be combusted in a flare or thermal oxidizer, producing sulfur dioxide ($SO_2$). Alternately, $H_2S$ may be recovered and converted to elemental sulfur with a sulfur recover plant such as a Claus plant.

The processes for acid gas removal, treatment, or destruction can be inefficient or impractical. Acid gas removal units can be large and costly to operate. Flares and thermal oxidizers often require additional fuel and generate $SO_2$, an often-regulated emission. Sulfur recovery plants can be difficult to operate successfully, are expensive, and require an end market or disposal option for the elemental sulfur generated. For remote locations, a cost effective approach is to reinject the acid gases into a reservoir either alone or with other hydrocarbons generated after NGL recovery.

Reinjecting the acid gases into a reservoir, however, requires compression power and leads to acid gas accumulation in the reservoir. Overtime the percentage of acid gas in the reservoir increases as the oil and NGL quantities decrease. As oil and natural gas are produced from the reservoir overtime, acid gas continues to be generated. The acid gas is produced from the reservoir during production, removed from the gas stream via acid gas removal, reinjected into the reservoir, and again produced from the reservoir during production, creating an endless cycle. This leads to increasing costs and requirements for acid gas removal and recompression capacity overtime.

Separation of acid gas components before treatment or destruction can help to make the acid gas treatment or destruction more feasible, but has its own challenges. It can be costly and difficult to separate $CO_2$ and $H_2S$ from each other. Membranes have been used to separate gaseous and liquid materials such as the individual components of acid gas, but thus far there are no membranes that exist that have the diffusion properties and selectivity to efficiently and effectively separate $CO_2$ and $H_2S$.

There are many different types of membranes, including porous membranes and dense polymer membranes. The various types of membranes operate via different methods. Dense polymer membranes operate through solution diffusion mechanisms. Gas transport through dense polymer membranes is governed by the expression:

$$J_i = \frac{D_i K_i^G (p_{io} - p_{i\ell})}{\ell}$$

where $J_i$ is the flux of component i (g/cm$^2$·s), $p_{io}$ and $p_{i\ell}$ are the partial pressures of the component i on either side of the membrane, l is the membrane thickness, $D_i$ is the permeate diffusion coefficient and $K_i^G$ is the Henry's Law sorption coefficient (g/cm$^3$·pressure). In gas permeation it is much easier to measure the volume flux through the membrane than the mass flux, so the equation is commonly rewritten as:

$$J_i = \frac{D_i K_i (p_{io} - p_{i\ell})}{\ell}$$

where $J_i$ is the volume (molar) flux expressed as (cm$^3$(STP) of component i)/cm$^2$·s) and $K_i$ is a sorption coefficient with units (cm$^3$(STP) of component i)/cm$^3$ of polymer·pressure). The product $D_i K_i$ can be written as '$P_i$ which is the membrane permeability, and is a measure of the membrane's ability to permeate gas, normalized for pressure driving force and membrane thickness. Permeability can be expressed as the product $D_i K_i$. The diffusion coefficient $D_i$ reflects the mobility of the individual molecules in the membrane material; the gas sorption coefficient $K_i$ reflects the number of molecules dissolved in the membrane material.

The term $j_i/(p_{io}-p_{i\ell})$ commonly referred to as the permeance or pressure normalized flux is commonly measured in terms of gas permeation unit (gpu), where 1 gpu is defined as $10^{-6}$ cm$^3$(STP)·cm/cm$^2$·s·cmHg, which is also 1 Barrer/ micron.

Membranes may be able to selectively transfer some compounds through the membrane over other compounds. Membrane selectivity is the measure of the ability of a membrane to separate two gases, and is a unitless value calculated as the ratio of the gases' permeabilities through the membrane. Membrane selectivity is calculated by the following equation:

$$\alpha_{i,j} = \frac{P_i}{P_j}$$

Where $\alpha_{i,j}$ is the membrane selectivity, $P_i$ is the permeability of gas i, and $P_j$ is the permeability of gas j. The permeability of gases is commonly measured in Barrer, or $10^{-10}$ cm$^3$ (STP)·cm/cm$^2$·s·cmHg.

The membrane selectivity equation can be rewritten as $$\alpha_{ij} = \left|\frac{D_i}{D_j}\right|\left|\frac{K_i}{K_j}\right|$$

The ratio $D_i/D_j$ is the ratio of the diffusion coefficients of the two gases and is commonly viewed as the mobility selectivity, reflecting the different sizes of the two molecules of the components i and j. The ratio $K_i/K_j$ is the ratio of the solubility coefficients of the two gases and is commonly viewed as the sorption or solubility selectivity, reflecting the relative solubilities of the two gases.

Thus far membranes have been unable to effectively and efficiently separate acid gas components and thus generate separate gas streams which can be treated in remote locations. Therefore, a need exists to effectively separate acid gas components in order to reduce the quantity of acid gas reinjected into reservoirs in remote locations.

SUMMARY

The disclosure relates to methods for capturing sulfur compounds from an acid gas waste stream in an isolated field. More specifically, the disclosure relates to enriching an acid gas stream by separating $CO_2$ and $H_2S$. The enriched $CO_2$ stream generated is released, further treated, or transported elsewhere. The enriched acid gas stream which is made of the remaining acid gas components is reinjected into a hydrocarbon-bearing reservoir. As explained previously, acid gas reinjection is a cost effective approach to handle acid gas in remote locations; however, overtime acid gas accumulation in the reservoirs can increase costs and operation requirements to remove acid gas from the produced hydrocarbons. Therefore, methods that enrich acid gas and decrease the quantity of acid gases being reinjected into a reservoir are desired.

In a first aspect, a method of capturing sulfur compounds from an acid gas waste stream in an isolated field is provided. The method includes the steps of introducing a gas stream to an acid gas removal unit, where the gas stream includes natural gas, carbon dioxide and hydrogen sulfide, and separating the gas stream in the acid gas removal unit to produce an acid gas stream and a sweet gas stream, where the acid gas removal unit is operable to produce the sweet gas stream of quality for further processing or sale, and where the sweet gas stream includes natural gas, and the acid gas stream includes hydrogen sulfide and carbon dioxide. The method further includes introducing the acid gas stream to an acid gas enrichment unit, and separating the acid gas stream in the acid gas enrichment unit to produce an enriched acid gas stream and a waste gas stream, where the waste gas stream includes carbon dioxide and the enriched acid gas stream includes hydrogen sulfide, and where the acid gas enrichment unit utilizes a removal process operable to selectively separate carbon dioxide and hydrogen sulfide in the acid gas stream. The method further includes introducing the enriched acid gas stream to an enriched acid gas reinjection compressor, and compressing the enriched acid gas stream in the enriched acid gas reinjection compressor to an operating pressure to generate an enriched acid gas reinjection stream, the operating pressure exceeding the pressure of the reservoir, and injecting the enriched acid gas reinjection stream into the reservoir.

In certain aspects, the method of capturing sulfur compounds from an acid gas waste stream is performed in an absence of a sulfur removal unit. In certain aspects, the method of capturing sulfur from an acid gas waste stream is performed in an absence of a thermal oxidizer. In certain aspects, the waste gas stream includes less than 150 parts per million (ppm) hydrogen sulfide. In certain aspects, the method further includes the step of discharging the waste gas stream to atmosphere. In certain aspects, the method further includes the step of introducing the waste gas stream to an enhanced oil recovery system. In certain aspects, the acid gas removal unit is selected from the group consisting of an absorption process using a solvent, an absorption process using an absorbent, an adsorption process, a membrane unit, and combinations of the same. In certain aspects, the method further includes the steps of combusting the waste gas stream in a combustion device to produce a combusted waste gas stream, and discharging the combusted waste gas stream to atmosphere, where the combustion device is selected from the group consisting of a waste gas heater, a flare, a thermal oxidizer, or combinations of the same.

In certain aspects, the enriched acid gas stream includes at least 2 weight percent hydrogen sulfide. In certain aspects, the enriched acid gas stream includes at least 10 weight percent hydrogen sulfide. In certain aspects, the enriched acid gas stream includes at least 50 weight percent hydrogen sulfide. In certain aspects, the enriched acid gas stream includes at least 60 weight percent hydrogen sulfide.

In certain aspects, the acid gas enrichment unit includes a solvent acid gas enrichment (sAGE) unit operable to absorb hydrogen sulfide form the acid gas stream into a solvent. In certain aspects, the acid gas enrichment unit includes a membrane acid gas enrichment (mAGE) compressor and a mAGE unit, and the method further includes the steps of compressing the acid gas stream with the mAGE compressor to produce a compressed acid gas stream, and introducing the compressed acid gas stream to the mAGE unit.

In certain aspects, the acid gas enrichment unit includes a hybrid mAGE compressor, a hybrid mAGE unit, and a hybrid sAGE unit, and the method further includes the steps of introducing an enriched acid gas recycle to the acid gas stream to generate a combined acid gas stream, and compressing the combined acid gas stream with the hybrid mAGE compressor to produce a compressed combined acid gas stream. The method further includes the steps of introducing the compressed combined acid gas stream to the hybrid mAGE unit, separating the compressed combined acid gas stream in the hybrid mAGE unit such that the hybrid mAGE unit produces a feed CO2 stream and the enriched acid gas stream, introducing the feed CO2 stream to the hybrid sAGE unit, the hybrid sAGE unit operable to absorb hydrogen sulfide from the acid gas stream into a solvent, and producing the enriched acid gas recycle and the waste gas stream from the hybrid sAGE unit by absorption and regeneration of the solvent.

In certain aspects, the mAGE unit includes a membrane with a selectivity for carbon dioxide over hydrogen sulfide of greater than 5. In certain aspects, the mAGE unit includes a membrane with a selectivity for carbon dioxide over hydrogen sulfide of greater than 20. In certain aspects, the mAGE unit includes a membrane with a selectivity for carbon dioxide over hydrogen sulfide of greater than 30. In certain aspects, the mAGE unit includes a two-step membrane process. In certain aspects, the mAGE unit includes a two-stage membrane process. In certain aspects, the mAGE unit a two-step, two-stage membrane process. In certain aspects, the mAGE unit includes a three-stage membrane process. In certain aspects, the mAGE unit includes a two-step, three-stage membrane process.

In certain aspects, the mAGE unit includes a membrane comprising a selective layer including a perfluoropolymer. In certain aspects, the perfluoropolymer is a monomer, copolymer, block copolymer, terpolymer, block terpolymer, or any molecular structure generated by a combination of monomers selected from the group of monomers including: CYTOP™ polymer material; HYFLON™ polymer material; TEFLON™ polymer; TEFLON™ polymer AF2400; TEFLON™ polymer AF1400; TEFLON™ polymer AD60; TEFLON™ polymer AD80; perfluoro(2-methylene-4,5-dimethyl-1,3-dioxolane); perfluoro(2-methylene-1,3-dioxolane); perfluoro-2,2-dimethyl-1,3-dioxole (PDD); perfluoro-3-butenyl-vinyl ether (PBVE); Perfluoro(2-methylene-4-methyl-1,3-dioxolane) (PFMMD); and Perfluoro(2-methylene-1,3-dioxolane) (PFMD). In certain aspects, the perfluoropolymer is a homopolymer, a copolymer, a block copolymer, a terpolymer, a block terpolymer, or any molecular structure generated by a combination of monomers selected from the group of monomers including:

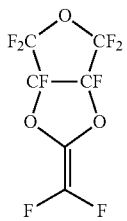

A

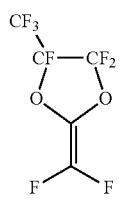

B

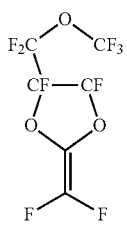

C

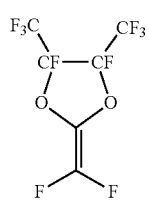

D

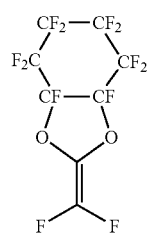

E

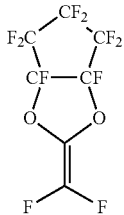

F

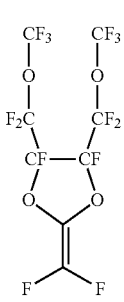

G

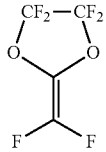

H and combinations of the same.

In certain aspects, the hybrid mAGE unit includes a membrane with a selectivity for carbon dioxide over hydrogen sulfide of greater than 5. In certain aspects, the hybrid mAGE unit includes a membrane with a selectivity for carbon dioxide over hydrogen sulfide of greater than 20. In certain aspects, the hybrid mAGE unit includes a membrane with a selectivity for carbon dioxide over hydrogen sulfide of greater than 30. In certain aspects, the hybrid mAGE unit includes a two-step membrane process. In certain aspects, the hybrid mAGE unit includes a two-stage membrane process. In certain aspects, the hybrid mAGE unit a two-step, two-stage membrane process. In certain aspects, the hybrid mAGE unit includes a three-stage membrane process. In certain aspects, the hybrid mAGE unit includes a two-step, three-stage membrane process.

In certain aspects, the hybrid mAGE unit includes a membrane comprising a selective layer including a perfluoropolymer. In certain aspects, the perfluoropolymer is a monomer, copolymer, block copolymer, terpolymer, block terpolymer, or any molecular structure generated by a combination of monomers selected from the group of monomers including: CYTOP™ polymer material; HYFLON™ polymer material; TEFLON™ polymer; TEFLON™ polymer AF2400; TEFLON™ polymer AF1400; TEFLON™ polymer AD60; TEFLON™ polymer AD80; perfluoro(2-methylene-4,5-dimethyl-1,3-dioxolane); perfluoro(2-methylene-1,3-dioxolane); perfluoro-2,2-dimethyl-1,3-dioxole (PDD); perfluoro-3-butenyl-vinyl ether (PBVE); Perfluoro(2-methylene-4-methyl-1,3-dioxolane) (PFMMD); and Perfluoro(2-methylene-1,3-dioxolane) (PFMD). In certain aspects, the perfluoropolymer is a homopolymer, a copolymer, a block copolymer, a terpolymer, a block terpolymer, or any molecular structure generated by a combination of monomers selected from the group of monomers including:

A 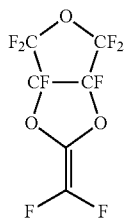

B 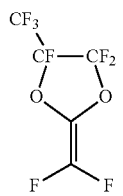

C 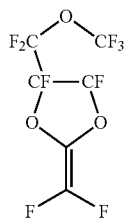

D 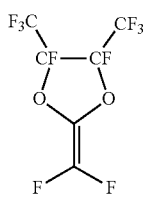

E 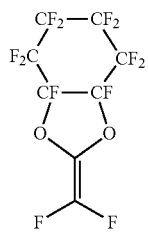

F 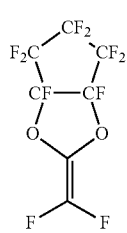

G 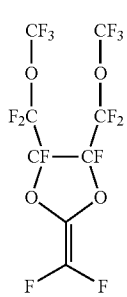

H 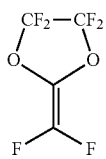

and combinations of the same.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

Figure 1:
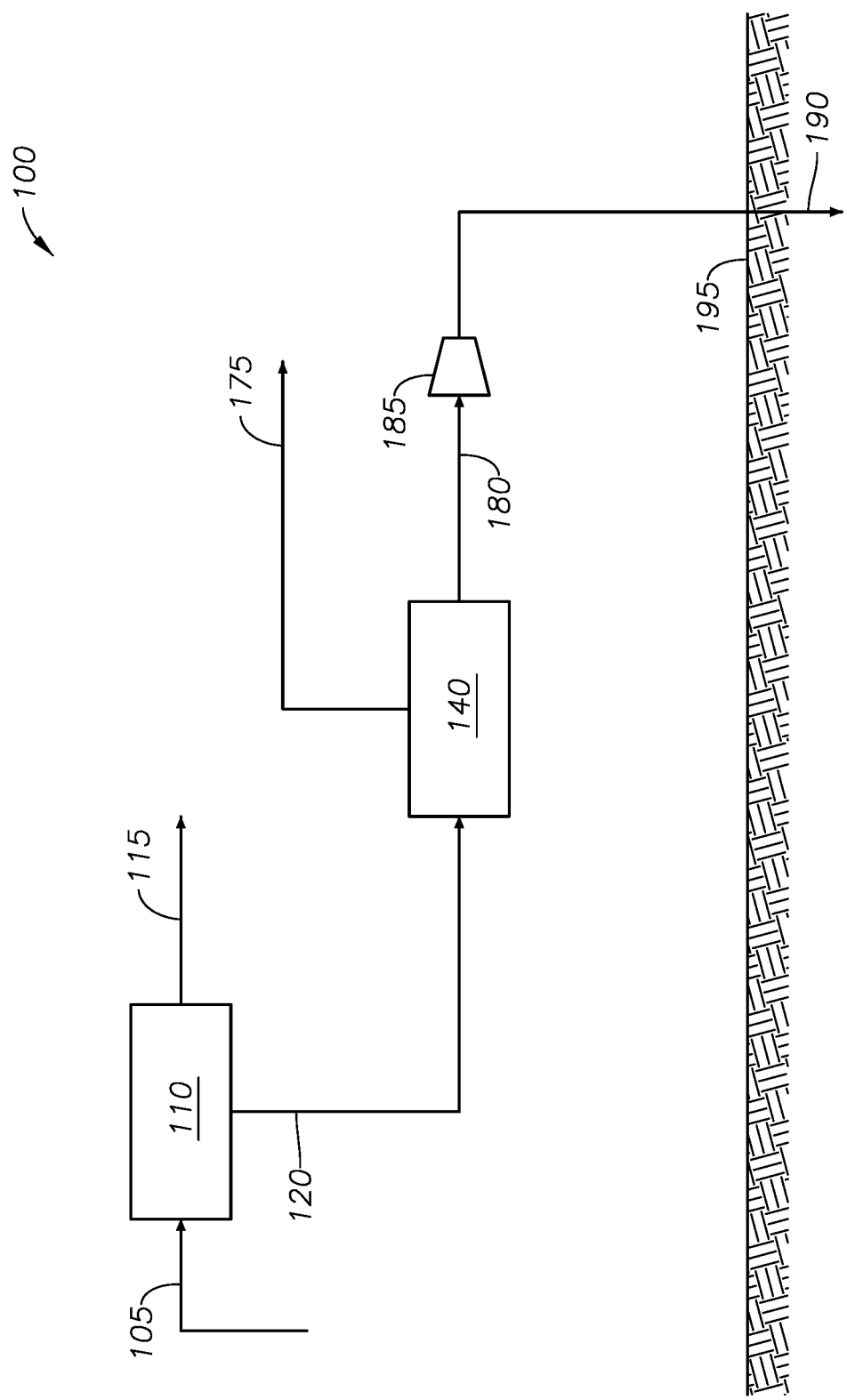
FIG. 1 is a block diagram of an acid gas enrichment system with reinjection into a reservoir, according to an embodiment.

In the accompanying Figures, similar components or features, or both, can have a similar reference label. For the purpose of the simplified schematic illustrations and descriptions of FIGS. 1 through 14, the numerous pumps, valves, temperature and pressure sensors, electronic controllers, and the like that can be employed and well known to those of ordinary skill in the art are not included. Transfer lines between the various components of the system can include pipes, conduits, channels, or other suitable physical transfer lines that connect by fluidic communication one or more system components to one or more other system components. Further, accompanying components that are in conventional industrial operations are not depicted. However, operational components, such as those described in the present disclosure, can be added to the embodiments described in this disclosure.

It should further be noted that arrows in the drawings refer to transfer lines which can serve to depict streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams can be further processed in processing systems or can be end products. System inlet streams can be streams transferred from accompanying processing systems or can be processed or non-processed feed streams.

DETAILED DESCRIPTION

While the disclosure will be described with several embodiments, it is understood that one of ordinary skill in the relevant art will appreciate that many examples, variations and alterations to the apparatus and methods described are within the scope and spirit of the disclosure. Accordingly, the embodiments of the disclosure described are set forth without any loss of generality, and without imposing limitations, on the claims.

As used in this disclosure, a "membrane" refers to a structure through which mass transfer can occur under a variety of driving forces. The driving forces can be a pressure differential between the two sides of the membrane generated by a positive pressure on the feed side of the membrane, a vacuum pressure on the permeate side of the membrane, stream component concentration differential between the permeate and retentate sides of the membrane, or combinations of the same. Driving forces that facilitate the transport of one or more components from the inlet gas stream through the selectively permeable membrane can be pressure, concentration, electrical potentials or combinations thereof across the membrane. Membrane operation can be in any mode such as high pressure at the feed side or vacuum pressure on the permeate side. The membrane allows a "penetrant" (a "penetrant" is an entity from a phase in contact with one of the membrane surfaces that passes through the membrane) to pass through the membrane from the retentate into the permeate. As used in this disclosure, the "retentate" is the stream that exits the membrane module without passing through the membrane, and has been depleted of penetrants. The membranes can be single or multilayered. As used in this disclosure, the "permeate" used as a noun can refer to the stream containing penetrants that leaves the membrane module, or can refer to the liquids and gases that have permeated the membrane of a membrane unit. Permeate can also be used in this disclosure as a verb, and means to spread through or flow through or pass through a membrane of a membrane unit. As an example, liquids and gases can permeate a membrane.

As used in this disclosure, "selective layer" refers to the membrane layer that is active in allowing the penetrant to pass through the membrane generating the permeate stream. As used in this disclosure, when a membrane is "selective for" a gas, that refers to the property of the membrane that allows more mass transport across the membrane material of one component as compared to the other component. For example, a $CO_2$ over $H_2S$ selective membrane preferentially transports $CO_2$ through the membrane in the presence of $H_2S$ and other components in the process stream to produce a $CO_2$-enriched permeate and a $CO_2$-depleted retentate.

As used in this disclosure, "thin-film, composite membranes" refers to membranes that consist of a thin polymer barrier layer formed on one or more porous support layers. The polymer barrier layer determines the flux and separation characteristics of the membrane; the porous backing serves only as a support for the selective layer and has no effect on membrane transport properties. As used in this disclosure, a reference to a membrane containing a specific material refers to the material used in the selective layer. The support structure can be made of any material.

As used in this disclosure, a "membrane module" refers to a manifold assembly containing a membrane or membranes to separate the streams of feed, permeate, and retentate. The membrane module can be any type of membrane module, including hollow fiber membrane modules, plate-and-frame membrane modules, spiral wound membrane modules, or potted hollow-fiber modules. Membranes can be arranged in the membrane module in a variety of configurations. Membranes can be in a flat-sheet configuration, a plate and frame configuration, or can be arranged to increase packing density, for example in a hollow-fiber or a capillary configuration or a spirally-wound configuration.

As used in this disclosure, a "sweep" refers to a nonpermeating gas stream that passes continuously by the downstream membrane face such that the permeate does not sit statically against the permeate side of the membrane, but is collected by the gas stream. The sweep can provide a driving force for the separation.

As used in this disclosure, "air" refers to the collective gases that constitute earth's atmosphere. Air contains nitrogen, oxygen, argon, carbon dioxide, water vapor, and other components. Unless otherwise indicated, the use of the term air includes all of the gases listed.

As used in this disclosure, a "stage" refers to a membrane process configuration where an additional membrane is positioned on the permeate discharge of a first membrane. Generally, additional compression is needed between the first membrane and the additional membrane because the permeate discharge is at a lower pressure than what is required to provide a driving force for separation. A multistage configuration can also have multiple recycles between membranes.

As used in this disclosure, a "step" refers to a membrane process configuration where an additional membrane is positioned on the retentate discharge of a first membrane. Generally, no additional compression is needed between the first membrane and the additional membrane, because the retentate discharge stream is at almost the same feed pressure. A multi-step configuration can also have multiple recycles between membranes.

The description may use the phrases "in some embodiments," "in an embodiment," or "in embodiments," which can each refer to one or more of the same or different embodiments. Furthermore, the terms "comprising," "including," "containing," and the like, as used with respect to embodiments of the present disclosure, are synonymous.

For the purposes of describing and defining the present disclosure, a composition that "substantially contains" a particular compound includes at least 51% by weight of that particular compound.

As used in this disclosure, the term "about" is utilized to represent the inherent degree of uncertainty that may be attributed to any quantitative comparison, value, measurement, or other representation. The term "about" is also utilized in this disclosure to represent the degree by which a quantitative representation can vary from a stated reference without resulting in a change in the basic function of the subject matter at issue.

In embodiments of the present disclosure, methods of managing the acid gas waste stream in a remote field is provided. The method involves introducing the gas stream containing natural gas to the acid gas removal unit, removing acid gas from the natural gas stream generating the acid gas stream, and further enriching the acid gas stream by separating $CO_2$ and $H_2S$. The acid gas enrichment occurs in the acid gas enrichment unit. After generating the enriched $CO_2$ stream, the remaining acid gas components are compressed and reinjected into the reservoir. The enriched $CO_2$ stream can be released to atmosphere, flared, combusted in a thermal oxidizer, used in enhanced oil recovery, or used locally.

The acid gas enrichment unit can include the solvent acid gas enrichment (sAGE) unit, the membrane acid gas enrichment (mAGE) unit, or the hybrid combination of both the mAGE unit in series with the sAGE unit. The sAGE unit can be any system using a solvent designed to separate $CO_2$ and $H_2S$. The mAGE unit can be any system using a membrane designed to separate $CO_2$ and $H_2S$. In an embodiment, the sAGE unit contains an $H_2S$ selective solvent which selectively absorbs $H_2S$ over $CO_2$. In an embodiment, the mAGE unit contains a membrane containing one or more perfluoropolymers.

Advantageously, the embodiments disclosed herein solve many problems. The embodiments disclosed herein increase the concentration of $CO_2$ in the streams released to atmosphere, flared, combusted in a thermal oxidizer, used in enhanced oil recovery, or used locally. The embodiments of the invention disclosed herein reduce the amount of undesirable $H_2S$ released to atmosphere or combusted. The embodiments of the invention disclosed herein also dispense with the need to recover $H_2S$ from the acid gas with a sulfur recovery plant such as a Claus plant, or the need to combust large amount of $H_2S$ in a flare or thermal oxidizer producing $SO_2$.

For remote locations, the embodiments disclosed herein provide a cost effective approach to deal with the acid gas reinjected into a reservoir, either as a stand-alone stream or with hydrocarbons generated after NGL recovery. Embodiments disclosed herein can reduce the amount of acid gas or $CO_2$ removed from the reservoir and then reinjected to the same reservoir over time, thereby reducing the $CO_2$ build-up rate in the reservoir. If the natural gas treated in the acid gas removal units is produced from the reservoir in which the acid gas is going to be re-injected, the removal of a $CO_2$ stream from the acid gas through the acid gas enrichment units disclosed herein reduces the amount of $CO_2$ being recirculated through the process. This reduces or alleviates the need for additional acid gas removal units, reduces acid gas operation requirements, reduces reinjection compression capacity requirements, and reduces reinjection compression power requirements. Embodiments of the invention disclosed herein can also be deployed as a retrofit to existing operations.

Referring now to the figures, block diagrams are provided showing embodiments of the invention. FIG. 1 is a block diagram of an acid gas reinjection system with acid gas enrichment 100, according to one or more embodiments described in this disclosure. The gas stream 105 is introduced to the acid gas removal unit 110. The gas stream 105 can include natural gas and natural gas liquids. Natural gas is made of hydrocarbons, and can substantially contain methane, and can further include ethane, propane, C3+ compounds, hydrocarbons, inert materials, and contaminants. Inert materials and contaminants for natural gas can include water, carbon dioxide, and sulfur compounds. Natural gas liquids are components of natural gas, and contain C2+ hydrocarbons, including ethane, propane, normal butane, isobutene, and C5+. Natural gas liquids can include natural gas plant liquids and liquefied refinery gases. The gas stream 105 can contain at least 10 mol % natural gas, alternately at least 20 mol % natural gas, alternately at least 30 mol % natural gas, alternately at least 40 mol % natural gas, alternately at least 50 mol % natural gas, alternately at least 60 mol % natural gas, alternately at least 70 mol % natural gas, alternately at least 80 mol % natural gas, alternately at least 90 mol % natural gas, and alternately at least 95 mol % natural gas. The gas stream 105 can be at any pressure or temperature necessary for extraction or processing. In some embodiments, the temperature of the gas stream 105 is in the range of 50° F. to 200° F., alternately 70° F. to 150° F., and alternately 80° F. to 120° F. In some embodiments, the pressure of the gas stream 105 is in the range of 250 psig to 1,750 psig, alternately 300 psig to 1,500 psig, and alternately 500 psig to 1,200 psig. The acid gas removal unit 110 can be any acid gas removal process used to separate acid gas, $CO_2$, $H_2S$, and combinations of the same from natural gas. The acid gas removal unit 110 can be an absorption process using amine or other solvents, an adsorption process using solid adsorption materials, a membrane separation process, or can used a combination of the above processes. In an embodiment, the acid gas removal unit 110 is an amine-based absorption unit operating at standard operating conditions. In some embodiments, the amine-based absorption unit operates in a temperature range of 50° F. to 120° F., and alternately 70° F. to 100° F. In some embodiments, the amine-based absorption unit operates at a pressure range from 250 psig to 1,750 psig, alternately 300 psig to 1,500 psig, and alternately 500 psig to 1,000 psig. The amine-based absorption unit can include any of the follow amines or combinations of the following amines: Flexsorb SE™, 2-[2-(Diethylamino) ethoxy] ethanol (DEAE-EO); monoethylene glycol (MEG); N-tert-Butyldiethanolamine (t-BDEA); 2-Dipropylaminoethanol (DPAE); 3-Diethylamino-1-propanol (3DEA-IP); 2-Dimethylaminoethanol (DMAE); 2-(Diethylamino)ethanol (DEEA); 2-(Dibutylamino)ethanol (DBAE); 6-Dimethylamino-1-Hexanol (DMAH); Diisopropylamine (DIPA); 3-(Diethylamino)-1,2-propanediol (DEA-1,2-PD); N-Methyldiethanolamine (MDEA); Triethanolamine (TEA); N-tert-Butyldiethanolamine (t-BDEA); and triethylene glycol (TEG). In an embodiment, the acid gas removal unit 110 contains contactors, scrubbers, strippers, condensers, flash tanks, reboilers, reclaimers, heat exchangers, pumps, and combinations of the same. In an embodiment, the acid gas removal unit 110 is a membrane separation unit with a membrane designed to separate hydrocarbons from acid gas. Membranes that can be utilized for acid gas removal include membranes containing cellulose acetate, polyimides, polycarbonates, and PEBAX™ (produced by Arkema) polyether block amides.

The acid gas removal unit 110 generates the sweet gas stream 115 and the acid gas stream 120. The sweet gas stream 115 can include saleable natural gas, natural gas liquids, water, other components, impurities, and combinations of the same. The sweet gas stream 115 can contain at least 70 mol % natural gas, alternately at least 80 mol % natural gas, alternately at least 90 mol % natural gas, alternately at least 95 mol % natural gas, alternately at least 98 mol % natural gas, alternately at least 99 mol % natural gas, and alternately at least 99.5 mol % natural gas. The sweet gas stream 115 can be at any pressure and temperature. The temperature of the sweet gas stream 115 can be in the range of 50° F. to 140° F., alternately 60° F. to 120° F., and alternately 80° F. to 110° F. The sweet gas stream 115 can have a pressure in the range of 250 psig to 1,750 psig, alternately 300 psig to 1,500 psig, and alternately 500 psig to 1,000 psig. In an embodiment, the sweet gas stream 115 undergoes further processing to make it of saleable quality, such as dehydration, natural gas liquids recovery, and nitrogen removal. In an embodiment, the sweet gas stream 115 undergoes natural gas liquids recovery and is then reinjected to the reservoir 195.

The acid gas stream 120 contains $CO_2$, $H_2S$, hydrocarbons, water, and other trace components. In an embodiment, the acid gas stream 120 contains from 1 to 99 mol % $CO_2$, alternately from 1 to 90 mol % $CO_2$, alternately from 1 to 80 mol % $CO_2$, alternately from 10 to 70 mol % $CO_2$, alternately from 10 to 60 mol % $CO_2$, alternately from 10 to 50 mol % $CO_2$, and alternately from 20 to 50 mol % $CO_2$. In an embodiment, the acid gas stream 120 contains from 1 to 80 mol % $H_2S$, alternately from 1 to 70 mol % $H_2S$, alternately from 10 to 60 mol % $H_2S$, alternately from 10 to 50 mol % $H_2S$, and alternately from 20 to 50 mol % $H_2S$. In an embodiment, the acid gas stream 120 contains from 1 to 15 mol % water, alternately from 1 to 10 mol % water, alternately from 1 to 5 mol % water, alternately from 1 to 3 mol % water, and alternately less than 10 mol % water. In an embodiment, the acid gas stream 120 contains less than 4 mol % hydrocarbons, alternately less than 2 mol % hydrocarbons, and alternately less than 1 mol % hydrocarbons. The acid gas stream 120 can be at any temperature and pressure. The acid gas stream 120 can be in the range of 70° F. to 130° F., alternately 80° F. to 120° F., and alternately 90° F. to 110° F. The acid gas stream 120 can have a pressure in the range of 70 psig to 500 psig, alternately 100 psig to 250 psig.

The acid gas stream 120 is introduced to the acid gas enrichment unit 140. The acid gas enrichment unit 140 can be any system or unit that uses chemical means, physical means, or other methods to separate $CO_2$ or $H_2S$ from the acid gas stream 120 generating a stream that contains more $CO_2$ than $H_2S$. In some embodiments, the acid gas enrichment unit 140 is an absorption unit utilizing a solvent. In an embodiment with an absorption unit utilizing a solvent, $H_2S$ is removed from the acid gas stream 120 using a solvent that selectively absorbs $H_2S$ over $CO_2$ into the solvent. In some embodiments where the acid gas enrichment unit 140 is an absorption unit utilizing a solvent that selectively absorbs $H_2S$ over $CO_2$ into the solvent, the solvent can then be regenerated, resulting in a stream containing a higher mol % of $H_2S$ than the mol % of $H_2S$ originally contained in the acid gas stream 120, and a stream substantially containing $CO_2$. In an embodiment with an absorption unit utilizing a solvent, $CO_2$ is removed from the acid gas stream 120 using a solvent that selectively absorbs $CO_2$ over $H_2S$ into the solvent.

In some embodiments, the acid gas enrichment unit 140 is a separation unit utilizing a membrane. In some embodiments, the acid gas enrichment unit 140 is a separation unit utilizing a membrane that is selective to $CO_2$ over $H_2S$ which separates the components of the acid gas stream 120.

In some embodiments, the acid gas enrichment unit 140 is a hybrid system containing both an absorption unit utilizing a solvent and a separation unit utilizing a membrane.

The acid gas enrichment unit 140 generates the waste gas stream 175 and the enriched acid gas stream 180. The waste gas stream 175 substantially contains $CO_2$, and can also include $H_2S$, water, and hydrocarbons. In an embodiment, the waste gas stream 175 contains greater than 80 mol % $CO_2$, alternately greater than 90 mol % $CO_2$, alternately greater than 95 mol % $CO_2$, and alternately greater than 99 mol % $CO_2$. The waste gas stream 175 can contain less than 4 mol % hydrocarbons. In an embodiment, the waste gas stream can contain less than 90 mol % water, alternately less than 70 mol % water, alternately less than 50 mol % water, alternately less than 40 mol % water, alternately less than 30 mol % water, and alternately less than 20 mol % water. In an embodiment, the waste gas stream 175 contains less than 150 ppm $H_2S$. The waste gas stream 175 can be sent to a flare, a thermal oxidizer, or in some cases directly to atmosphere. In another embodiment, the waste gas stream 175 is used for enhanced oil recovery, carbon sequestration, or reinjection into a separate reservoir or formation from the reservoir 195 which is receiving the enriched acid gas reinjection stream 190. The waste gas stream 175 can be at any temperature or pressure. The waste gas stream 175 can have a temperature in the range of 90° F. to 150° F., alternately 100° F. to 140° F., and alternately 110° F. to 130° F. The waste gas stream 175 can have a pressure in the range of 10 psig to 50 psig, alternately 15 psig to 45 psig, and alternately 20 psig to 40 psig.

The enriched acid gas stream 180 contains $CO_2$ and $H_2S$. The enriched acid gas stream 180 can contain hydrocarbons. The enriched acid gas stream 180 can contain less than 4 mol % hydrocarbons. In an embodiment, the enriched acid gas stream 180 contains at least 20 mol % $H_2S$, alternately at least 30 mol % $H_2S$, alternately at least 40 mol % $H_2S$, alternately at least 50 mol % $H_2S$, and alternately at least 60 mol % $H_2S$, alternately at least 80 mol % $H_2S$, and alternately at least 90 mol % $H_2S$. In an embodiment, the enriched acid gas stream 180 contains less than 20 mol % water, and alternately less than 15 mol % water.

The enriched acid gas stream 180 is then compressed in the enriched acid gas reinjection compressor 185. The enriched acid gas reinjection compressor 185 can be any type of compressor appropriate to increase the pressure of the enriched acid gas stream 180 such as reciprocating compressors, rotary compressors, centrifugal compressors, axial compressors, and similar equipment known in the art. The enriched acid gas reinjection compressor 185 can operate at any operating conditions necessary to increase the pressure of the enriched acid gas stream 180 to allow for reinjection into the reservoir 195. The reservoir 195 pressure can be in the range of 2,000 psi to 10,000 psi. The enriched acid gas reinjection compressor 185 increases the pressure of the enriched acid gas stream 180 generating the enriched acid gas reinjection stream 190. The enriched acid gas reinjection stream 190 can be at an operating pressure exceeding pressure of the reservoir 195. The enriched acid gas reinjection stream 190 can be at a pressure in the range of 2,000 psi to 10,000 psi, alternately 4,000 psi to 8,000 psi, and alternately 2,000 psi to 5,000 psi. The enriched acid gas reinjection stream 190 has the same composition as the enriched acid gas stream 180.

Advantageously, due to the removal of $CO_2$ through the waste gas stream 175, the amount (mass) of the enriched acid gas reinjection stream 190 is reduced as compared to the acid gas stream 120 which would have been reinjected into the reservoir 195 without the acid gas enrichment unit 140. This results in a reduction of compressor requirements, such as the reinjection compressors used to reinject the acid gas to the reservoir, and a reduction in acid gas removal requirements. It additionally results in a reduction of $CO_2$ build up in the reservoir.

Figure 2:
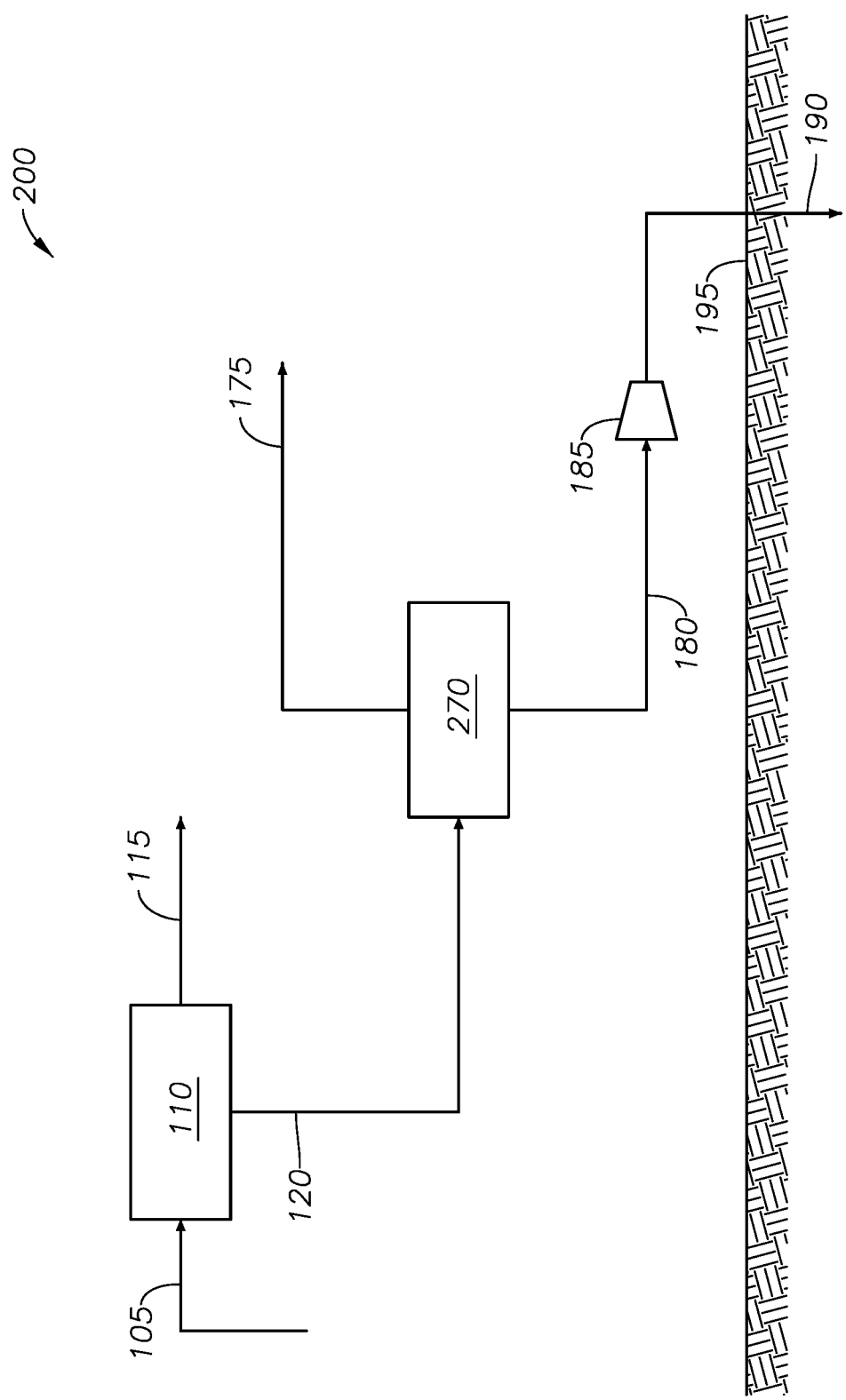
FIG. 2 is a block diagram of an acid gas enrichment system with a sAGE unit with reinjection into a reservoir, in accordance with another embodiment.

Referring now to FIG. 2, a block diagram of an embodiment of the present invention of an acid gas reinjection system with sAGE 200 is shown. Streams and units with the same number as depicted in FIG. 1 have the same characteristics as streams and units with the corresponding number in FIG. 2. In an embodiment, the acid gas enrichment unit 140 includes the sAGE unit 270 as shown in FIG. 2. The acid gas stream 120 is introduced to the sAGE unit 270. The sAGE unit 270 can be any absorption system or unit utilizing a solvent designed to selectively absorb $H_2S$, and then regenerate the solvent. In the sAGE unit 270 the acid gas stream 120 contacts the solvent, where the solvent absorbs compounds. The sAGE unit 270 then uses a regeneration system to regenerate the solvent, generating a concentrated gas stream of whichever component to which the solvent is selective. In an embodiment, the sAGE unit 270 is an amine unit. In a further embodiment, the sAGE unit 270 is an amine unit utilizing an amine that is selective to $H_2S$. The amine unit is operated similar to amine units known in the art. The acid gas stream 120 entering the sAGE unit 270 can be in a temperature range of 60° F. to 110° F., and alternately 70° F. to 100° F. The sAGE unit 270 can be a low pressure system. The acid gas stream 120 entering the sAGE unit 270 can be in a pressure range of 10 psia to 50 psia, and alternately 15 psia to 30 psia. In an embodiment, when the solvent is regenerated the gas produced from regeneration is the enriched acid gas stream 180.

In an embodiment, the sAGE unit 270 employs an amine in an aqueous solution to remove $H_2S$ from a gas stream. Examples of amines that can be used in this embodiment include tertiary amines like methyldiethanolamine (MDEA), which are hindered amine that kinetically react faster with $H_2S$ than with $CO_2$. Separation and the selectivity for $H_2S$ or CO2 for each amine is based on the kinetics of absorption, where $H_2S$ has a faster reaction time with tertiary amine as compared to $CO_2$, such that the $H_2S$ can be bulk separated. When the sAGE unit 270 uses amine, the hydrocarbons will remain with the $CO_2$ and reside in the waste gas stream 175.

Figure 3:
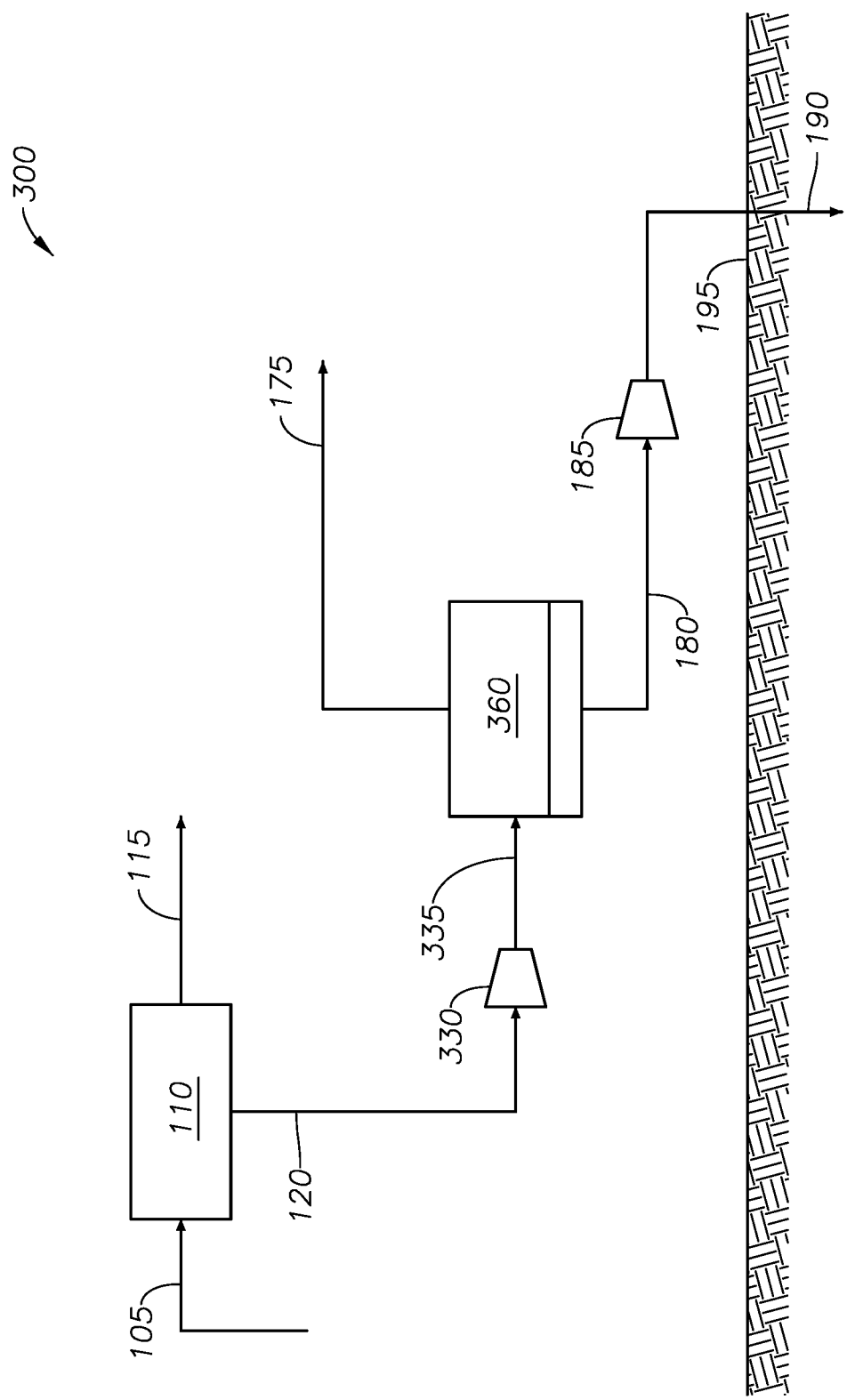
FIG. 3 is a block diagram of an acid gas enrichment system with a mAGE unit with reinjection into a reservoir, in accordance with another embodiment.

Referring now to FIG. 3, a block diagram of an embodiment of the present invention of an acid gas reinjection system with mAGE 300 is shown. Streams and units with the same number as depicted in FIG. 1 or FIG. 2 have the same characteristics as streams and units with the corresponding number in FIG. 3. The acid gas enrichment unit 140 includes the mAGE compressor 330 and the mAGE unit 360. The acid gas stream 120 is introduced to the mAGE compressor 330. The mAGE compressor 330 compresses the acid gas stream 120 generating the compressed acid gas stream 335. The mAGE compressor 330 can be any kind of compressor that increases the pressure of the acid gas stream 120. The mAGE compressor 330 can be a same or similar type of compressor as the reinjection compressor 185. The compressed acid gas stream 335 is at a higher pressure than the acid gas stream 120. The compressed acid gas stream 335 can be in the range of 60 psig to 500 psig, alternately 70 psig to 400 psig, alternately 70 psig to 300 psig, alternately 70 psig to 200 psig, and alternately 100 psig to 200 psig. It can be necessary to increase the pressure of the gas being introduced to the membrane because the pressure can drive the mass transfer of the compounds through the membrane. The compressed acid gas stream 335 can be at any temperature appropriate for the membrane in the mAGE unit 360. The compressed acid gas stream 335 can be in the temperature range of 35° F. to 160° F., alternately 40° F. to 150° F., alternately 55° F. to 125° F., and alternately 70° F. to 120° F. The compressed acid gas stream 335 is then introduced to the mAGE unit 360. The mAGE unit 360 contains a $CO_2$ over $H_2S$ selective membrane in the compressed acid gas stream 335.

The mAGE unit 360 can be a unit utilizing a selectively permeable membrane for the separation, concentration, removal, and/or purification of one or more components present in an inlet gas stream. The mAGE unit 360 can include one or more membrane modules. The mAGE unit 360 can include one or more stages, and one or more steps. The mAGE unit 360 can be a one-step, one-stage membrane module. The mAGE unit 360 can be configured as a two-step membrane process; or alternately as a two-stage membrane process; or alternately as a two-step, two-stage membrane process; or alternately as a three-stage membrane process; or alternately as a two-step, three-stage membrane process.

The membrane in the mAGE unit 360 can be any type membrane, including composite membranes, asymmetric membranes, homogeneous film membranes, or integral asymmetric membranes. The membrane can operate with a co-current flow pattern, a completely-mixed flow pattern, a counter-current flow pattern, or a cross flow pattern. An air sweep can be supplied to sweep the permeate side of the membrane. The membrane used in this disclosure can be configured in one stage, two stages, or three or more stages. The membrane used in this disclosure can be configured in one step, two steps, or three or more steps. The membrane used in this disclosure can be configured in any combination of steps and stages.

In an embodiment, the membrane is a dense, thin polymer membrane. In a further embodiment, the dense, thin polymer membrane contains glassy perfluoro hydrophobic polymers. Without being bound by any theory, it is believed that mass transfer through thin dense polymer films occurs by a solution diffusion mechanism.

In membranes containing glassy perfluoro polymers, or glassy perfluoro-co-polymers, the diffusion and solubility term for $CO_2$ permeation is maximized, making the membrane selective to $CO_2$ over $H_2S$.

The membrane used in the mAGE unit 360 can be a $CO_2$ over $H_2S$ selective membrane. Membrane selectivity is the measure of the ability of a membrane to separate two gases, and is a unitless value calculated as the ratio of the gases' permeabilities through the membrane. The membrane used in the mAGE unit 360 can have a selectivity of $CO_2$ over $H_2S$ of greater than 3, alternately greater than 4, alternately greater than 5, alternately greater than 7, alternately greater than 10, alternately greater than 15, alternately greater than 20, alternately greater than 25, and alternately greater than 30. Water vapor will pass through the membrane along with the permeate. Hydrocarbons will not pass through the membrane and will remain with the retentate.

In an embodiment, the $CO_2$ over $H_2S$ membrane contains CYTOP™ (a registered trademark of Asahi) material, HYFLON™ (a registered trademark of Solvay) material, TEFLON™ (a registered trademark of DuPont) AF material, or combinations of the same. These materials are commercially available amorphous perfluoropolymers. CYTOP™ material is a polymer made of the monomer having the chemical structure of:

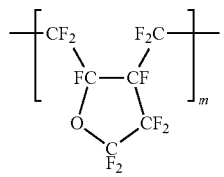

The variable m can be repeated to generate the polymer. Membranes containing CYTOP™ material have a typical $CO_2/H_2S$ selectivity of about 28. Acceptable grades of CYTOP™ material include CYTOP-A and CYTOP-M. CYTOP-A includes an R structure of —COOH between or at the end of the repeating monomers. CYTOP-M includes an R structure of —CONH—SI(OR')$_3$ between or at the end of the repeating monomers.

HYFLON™ material is a polymer made of the monomer having the chemical structures of:

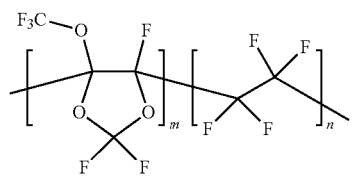

The variables m or n can be repeated to generate the polymer. Acceptable grades of HYFLON™ material includes HYFLON AD materials, HYFLON HD40, where m=0.4 and n=0.6; HYFLON HD60, where m=0.6, and n=0.4; and HYFLON HD80, where m=0.8 and n=0.2. Membranes containing HYFLON AD60 have a selectivity of 14.

TEFLON™ AF material is a copolymer made of the monomers having the chemical structures of:

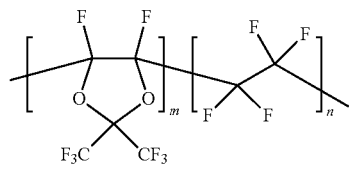

The variables m or n can be repeated to generate the polymer. Various grades of TEFLON™ AF material can be used, such as TEFLON™ AF2400 and TEFLON™ AF1400. TEFLON™ AF material is made of copolymers of 2,2-bistrifluoromethyl-4,5-difluoro-1,3-dioxole (PPD), shown as monomer m above, and tetrafluoroethylene (TFE), shown as monomer n above, where m=0.87 and n=0.13. Membranes containing TEFLON™ material have a typical selectivity of greater than 5.5, or greater than 6.5.

The membrane can contain homopolymers of CYTOP™ material, HYFLON™ material or TEFLON™ material; or copolymers of CYTOP™ material, HYFLON™ material or TEFLON™ material; or block copolymers of CYTOP™ material, HYFLON™ material or TEFLON™ material; or copolymers of combinations of CYTOP™ material, HYFLON™ material or TEFLON™ material; or block copolymers of combinations of CYTOP™ material, HYFLON™ material or TEFLON™ material. For example, the material can be a terpolymer of the CYTOP™ monomer and the TEFLON™ monomers.

In an embodiment, the $CO_2$ over $H_2S$ selective membrane contains a glassy hydrophobic perfloropolymer with membrane selectivity values for $CO_2$ to $H_2S$ of 10 or more. In an embodiment, the $CO_2$ over $H_2S$ selective membrane contains a glassy hydrophobic perfloropolymer with membrane selectivity values of $CO_2$ as compared to $H_2S$ of 12 or more. The membrane can be made of a homopolymer, copolymer, block copolymer, terpolymer, or block terpolymer of a combination of monomers A through H, pictured below:

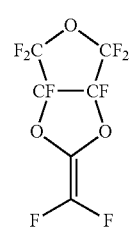

A

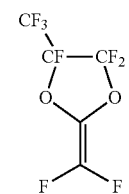

B

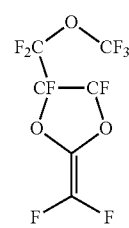

C

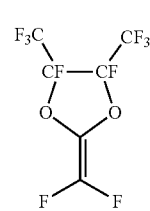

D

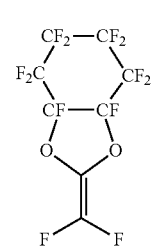

E

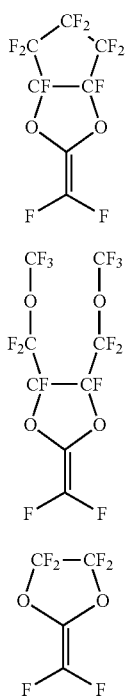

For example, the membrane can contain a homopolymer of monomer C. The membrane can contain a copolymer of monomer C and B, or the membrane can contain a block copolymer of monomers C and B. The membrane can contain a terpolymers of monomers C, B and G, or can be a block terpolymer of monomers C, B, D, G and H. The membrane can contain copolymers of monomers B and H, or can be a block terpolymers of monomers C, B, D, E, and G. The membrane can contain multiple materials made of the various polymer generated from the homopolymers, copolymers, block copolymers, terpolymers, or block terpolymers of monomers A through H. For example, the membrane can contain a layer containing a material made of a block copolymer of monomers A and E, and the membrane my further contain a layer containing a material made of a terpolymer of monomers D, F, and H. Any combination of the above monomers generating a polymer is envisioned as a possible use for the membrane material in this disclosure.

In an embodiment, the CO$_2$ over H$_2$S selective membrane contains a glassy hydrophobic perfloropolymer containing homopolymers, copolymers, block copolymers, terpolymers, and block terpolymers containing the monomers perfluoro(2-methylene-4,5-dimethyl-1,3-dioxolane) (monomer D, pictured above); perfluoro(2-methylene-1,3-dioxolane) (monomer H, pictured above); perfluoro-2,2-dimethyl-1,3-dioxole (PDD); perfluoro-3-butenyl-vinyl ether (PBVE); Perfluoro(2-methylene-4-methyl-1,3-dioxolane) (PFMMD); Perfluoro(2-methylene-1,3-dioxolane) (PFMD); or combinations of the same. PDD has the following chemical structure:

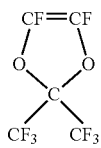

In an embodiment, the CO$_2$ over H$_2$S selective membrane contains a copolymer or block copolymer of PDD and PBVE. PBVE has the following chemical structure:

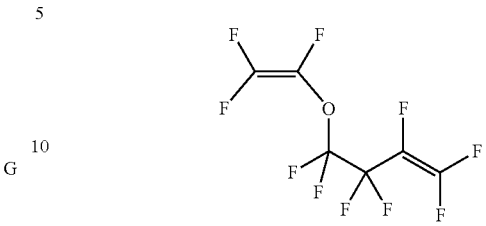

In an embodiment, the CO$_2$ over H$_2$S selective membrane contains a copolymer or block copolymer of monomer D and PBVE. In an embodiment, the CO$_2$ over H$_2$S selective membrane contains a copolymer or block copolymer of monomer H and PBVE. In an embodiment, the CO$_2$ over H$_2$S selective membrane contains a copolymer or block copolymer of monomers D and H.

The CO$_2$ over H$_2$S selective membrane can contain a polymer of polysulfone (PSf) with a selectivity of about 3.9, polycarbonate (PC) with a selectivity of about 4.3, TEFLON™ AF 1600 with a selectivity of about 6.8, or a random copolymer of tetrafluoroethylene (TFE), perfluoromethyl vinyl ether (PMVE), and perfluoro-8-cyano-5-methyl-3,6-dioxa-1-octene (8CNVE) (TFE/PMVE/8CNVE) with a selectivity of about 8.

One of skill in the art will appreciate that the size, permeability, and selectivity of membranes are design features based on the requirements of the system. While in general the larger the surface area, the greater the recovery, there is a tipping point at which the economics make it unfeasible to increase the surface area of the membrane. The type of membrane selected is in consideration of the desired permeability and selectivity of the membrane, the acid gas composition, etc. One of skill in the art will appreciate that additional stages and steps can be added, along with recycle streams, that encompass the spirit of the disclosure herein. Various designs of recycle streams between steps and stages can influence the desired final results, and are encompassed by the spirit of the disclosure herein.

Returning now to FIG. 3, by allowing the CO$_2$ to permeate the membrane, the mAGE unit 360 generates the waste gas stream 175. The waste gas stream 175 can be at a pressure between 10 psig and 75 psig. The retentate exits the mAGE unit 360 as the enriched acid gas stream 180. The level of CO$_2$ in the waste gas stream 175 can be adjusted with process parameters such as the pressure of the compressed acid gas stream 335, compression provided by the mAGE compressor 330, and pressure differential between the waste gas stream 175 and the compressed acid gas stream 335. The enriched acid gas stream 180 can then be compressed and reinjected to the reservoir.

Figure 4:
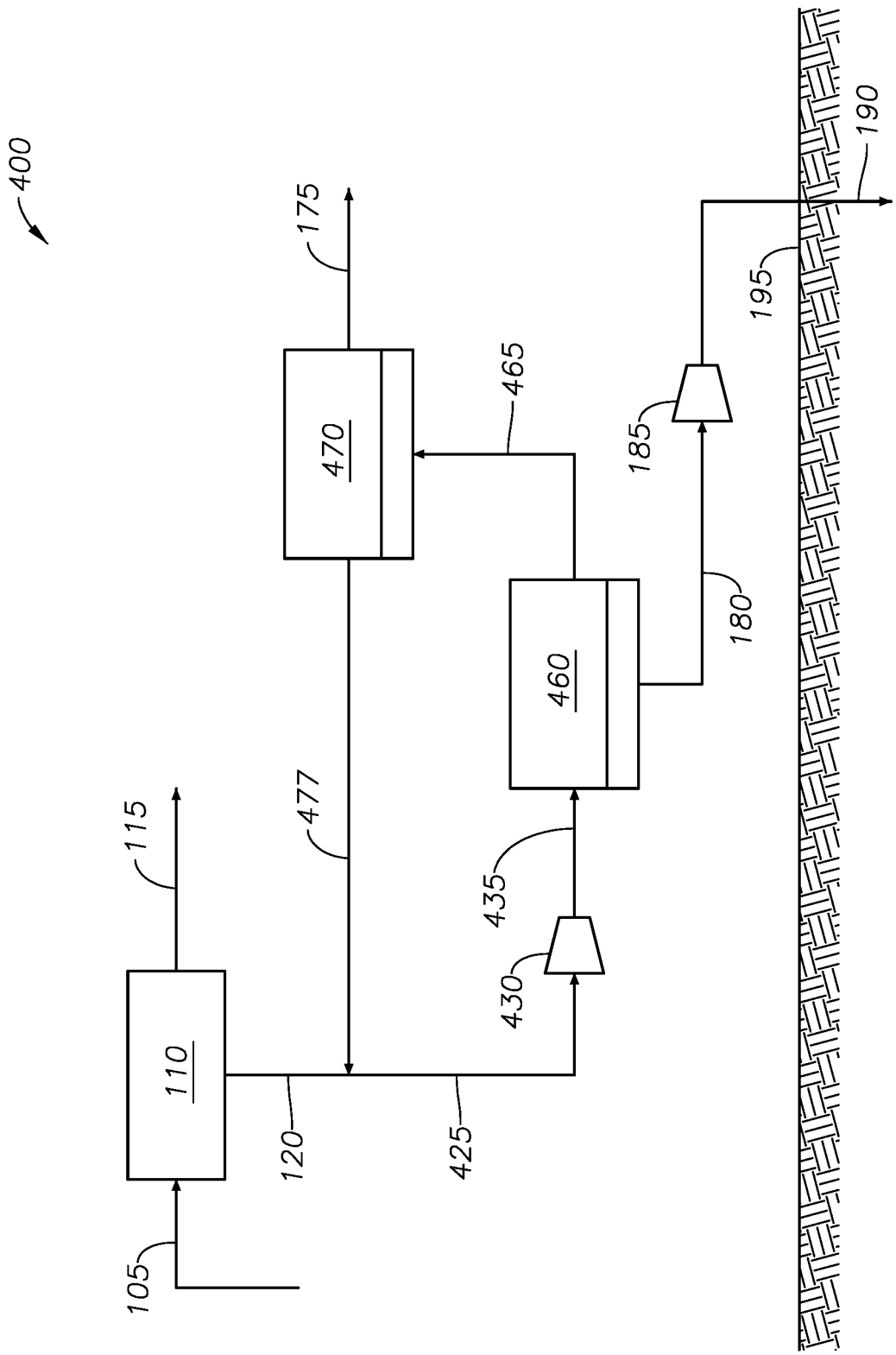
FIG. 4 is a block diagram of an acid gas enrichment system with a hybrid acid gas enrichment unit with both a mAGE unit and a sAGE unit with reinjection into a reservoir, in accordance with another embodiment.

Referring now to FIG. 4, a block diagram is provided of an acid gas reinjection system with mAGE and sAGE 400, according to an embodiment described in this disclosure. Streams and units with the same number as depicted in FIG. 1, 2, or 3 have the same characteristics as streams and units with the corresponding number in FIG. 4. In an embodiment, the acid gas enrichment unit 140 includes the hybrid mAGE compressor 430, the hybrid mAGE unit 460, and the hybrid sAGE unit 470, as shown in FIG. 4. The hybrid sAGE unit 470 can be operated at a pressure range of 20 to 45 psia, alternately 25 to 40 psia, and alternately 25 to 35 psia. The hybrid sAGE unit 470 can be operated at a temperature between 70° F. and 130° F., alternately 80° F. and 120° F., and alternately 90° F. to 120° F. The acid gas stream 120 can be combined with the enriched acid gas recycle 477 to generate the combined acid gas stream 425. The combining of the acid gas stream 120 and the enriched acid gas recycle 477 can be performed by any method. The enriched acid gas recycle 477 can have the same composition ranges as the enriched acid gas stream 180. The combined acid gas stream 425 can be at any temperature or pressure. The combined acid gas stream 425 is compressed in the hybrid mAGE compressor 430 generating the compressed combined acid gas stream 435. The compressed combined acid gas stream 435 is at a higher pressure than the acid combined gas stream 425. The pressure of the compressed combine acid gas stream 435 can be in the range of 15 psig to 450 psig, alternately 30 psig to 400 psig, alternately 30 psig to 350 psig, and alternately 50 psig to 300 psig. The compressor can be any kind of compressor that increases the pressure of the stream. The hybrid mAGE compressor 430 can be the same types of compressor as the mAGE compressor 330. The compressed combined acid gas stream 435 can be at any temperature appropriate for the membrane in the hybrid mAGE unit 460. The compressed combined acid gas stream 435 can be in the temperature range of 125° F. to 500° F., alternately 140° F. to 490° F., alternately 150° F. to 300° F., and alternately 100° F. to 120° F. The compressed combined acid gas stream 435 is then introduced to the hybrid mAGE unit 460. The hybrid mAGE unit 460 can have the same composition and configuration options as the mAGE unit 360. The hybrid mAGE unit can be a one-step, one-stage membrane module. The hybrid mAGE unit 460 can be configured as a two-step membrane process; or alternately as a two-stage membrane process; or alternately as a two-step, two-stage membrane process; or alternately as a three-stage membrane process; or alternately as a two-step, three-stage membrane process.

In an embodiment, the hybrid mAGE unit 460 separates $CO_2$ from the compressed combined acid gas stream 430 generating the feed CO2 stream 465 and the and the enriched acid gas stream 180. The enriched acid gas stream 180 can have a pressure in the range of 10 psig and 80 psig, alternately 15 psig to 75 psig, and alternately 15 psig to 50 psig. In an embodiment, the feed CO2 stream 465 is generated from the permeate side of the $CO_2$ selective membrane in the hybrid mAGE unit 460. The feed CO2 stream 465 contains $CO_2$ and $H_2S$. In an embodiment, the feed CO2 stream 465 contains at least 70 mol % $CO_2$, alternately at least 80 mol % $CO_2$, alternately at least 90 mol % $CO_2$, alternately at least 91 mol % $CO_2$, alternately at least 93 mol % $CO_2$, alternately at least 95 mol % $CO_2$, alternately at least 97 mol % $CO_2$, and alternately at least 98 mol % $CO_2$.

The feed CO2 stream 465 is sent to the hybrid sAGE unit 470. The hybrid sAGE unit 470 can have the same composition and configuration options as the sAGE unit 270. The hybrid sAGE unit 470 produces the waste gas stream 175. In an embodiment, the hybrid sAGE unit 470 generates, by the regeneration process of the $H_2S$ selective amine, the enriched acid gas recycle 477. The enriched acid gas recycle 477 contains $H_2S$ and $CO_2$. In an embodiment, the enriched acid gas recycle 477 contains at least 5 mol % $H_2S$, alternately at least 10 mol % $H_2S$, alternately at least 15 mol % $H_2S$, alternately at least 20 mol % $H_2S$, alternately at least 25 mol % $H_2S$, alternately at least 30 mol % $H_2S$, alternately at least 35 mol % $H_2S$, and alternately at least 40 mol % $H_2S$.

Advantageously, the combination of the hybrid mAGE unit and the hybrid sAGE unit provides a cost effective solution by utilizing the mAGE and sAGE technology at the optimum operating conditions for each technology. The membranes that can be included in the mAGE units operate most efficiently with an intermediate concentration of $H_2S$, where the $H_2S$ content is between 10 mol % and 60 mol %. The solvent that can be utilized in the sAGE units operate most efficiently with a low concentration of $H_2S$, where the $H_2S$ content is less than 40 mol %. The mAGE and sAGE units, however, can be operated at any concentration of $H_2S$ and $CO_2$.

The mAGE unit 360 and the hybrid mAGE unit 460 can be configured in various ways. The mAGE unit 360 and the hybrid mAGE unit 460 can include at least one $CO_2$ over $H_2S$ selective membrane. One of skill in the art will appreciate that additional stages and steps can be added, along with recycle streams, that encompass the spirit of the disclosure herein.

Figure 5:
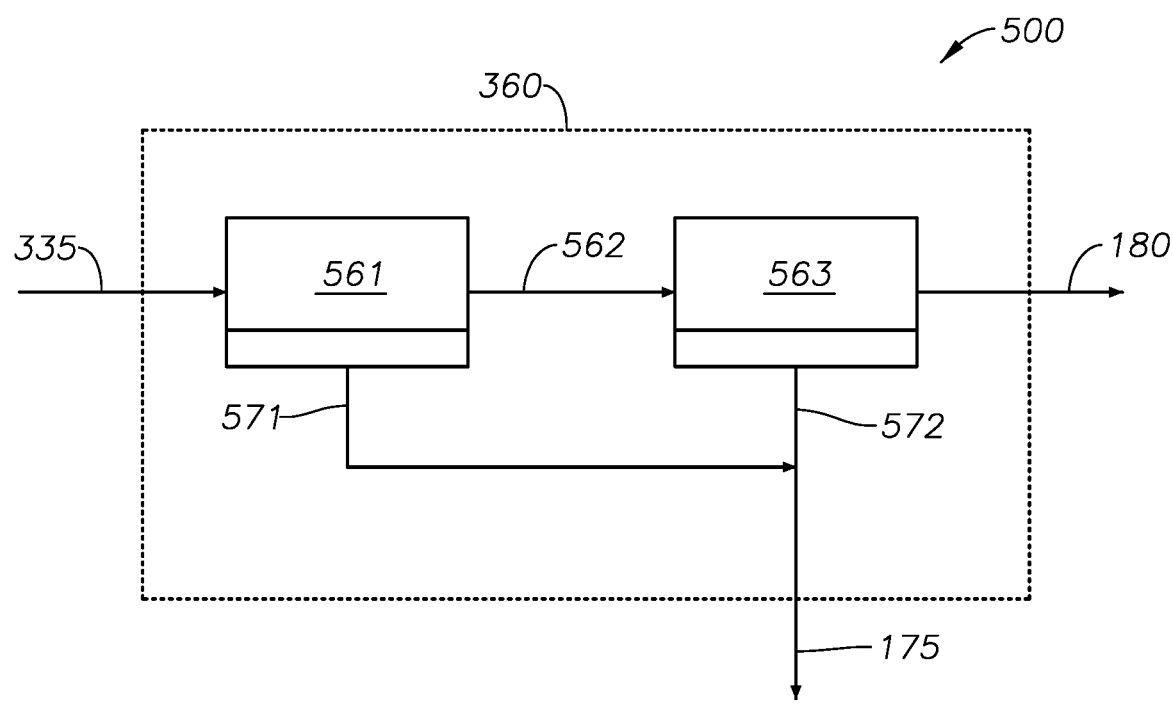
FIG. 5 is a block diagram of a mAGE unit with a two-step membrane process, in accordance with another embodiment.

Referring now to FIG. 5, a block diagram is provided of the mAGE unit 360 with a two-step membrane process 500, according to an embodiment described in this disclosure. Streams and units with the same number as depicted in FIGS. 1 through 4 have the same characteristics as streams and units with the corresponding number in FIG. 5. The mAGE unit 360 includes a first CO2 selective membrane 561 and a second CO2 selective membrane 563. The first $CO_2$ selective membrane 561 and the second $CO_2$ selective membrane 563 used in the mAGE unit 360 can have the same characteristics as membranes discussed herein. In an embodiment, the first CO2 selective membrane 561 and the second CO2 selective membrane 563 are $CO_2$ over $H_2S$ selective membranes which selectively permeate $CO_2$ through the membrane over $H_2S$. In an embodiment, the compressed acid gas stream 335 is introduced to the first CO2 selective membrane 561. By allowing the $CO_2$ to permeate the first CO2 selective membrane 561, a first CO2 selective membrane permeate 571 is generated and removed from the permeate side of the first CO2 selective membrane 561. The first CO2 selective membrane permeate 571 contains a higher percentage of $CO_2$ than the compressed acid gas stream 335. A first CO2 selective membrane retentate 562 exits the retentate side of the first CO2 selective membrane 561. The first CO2 selective membrane retentate 562 contains a lower percentage of CO2 than the compressed acid gas stream 335. The first CO2 selective membrane retentate 562 is introduced to the retentate side of the second CO2 selective membrane 563. By allowing the $CO_2$ to permeate the second CO2 selective membrane 563, a second CO2 selective membrane permeate 572 is generated and removed from the permeate side of the second CO2 selective membrane 563. The second CO2 selective membrane permeate 572 has a higher percentage of $CO_2$ than the first CO2 selective membrane retentate 562. The enriched acid gas stream 180 is removed from the retentate side of the second CO2 selective membrane 563. The enriched acid gas stream 180 contains a lower percentage of $CO_2$ than the first CO2 selective membrane retentate 562. The first CO2 selective membrane permeate 571 and the second CO2 selective membrane permeate 572 can be combined to generate the waste gas stream 175. Alternately, the second CO2 selective membrane permeate 572 can be recycled to the retentate side of the first CO2 selective membrane 561, such that the first CO2 selective membrane permeate 571 generates the waste gas stream 175. Additional compression can be included in the mAGE unit 360 to increase the pressure of the streams and provide enough pressure for the membrane feed. Additional recycle streams can be included to improve efficiency.

Figure 6:
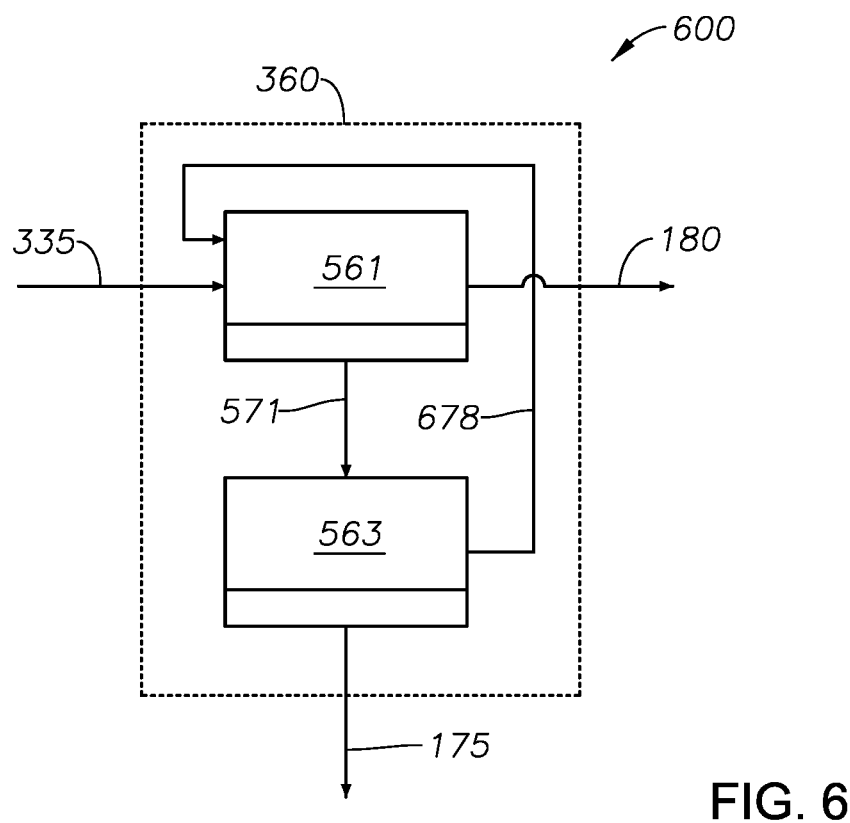
FIG. 6 is a block diagram of a mAGE unit with a two-stage membrane process, in accordance with another embodiment.

Referring now to FIG. 6, a block diagram is provided of the mAGE unit 360 with a two-stage membrane process 600, according to an embodiment described in this disclosure. Streams and units with the same number as depicted in FIGS. 1 through 5 have the same characteristics as streams and units with the corresponding number in FIG. 6. The mAGE unit 360 includes the first CO2 selective membrane 561 and the second CO2 selective membrane 563. The first CO2 selective membrane 561 and the second CO2 selective membrane 563 used in the mAGE unit 360 can have the same characteristics as membranes discussed herein. The first CO2 selective membrane 561 and the second CO2 selective membrane 563 are $CO_2$ over $H_2S$ selective membranes which selectively permeate $CO_2$ through the membrane over $H_2S$. The compressed acid gas stream 335 is introduced to the first $CO_2$ selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 contains a higher percentage of $CO_2$ than the compressed acid gas stream 335. The enriched acid gas stream 180 exits the retentate side of the first CO2 selective membrane 561. The enriched acid gas stream 180 contains a lower percentage of $CO_2$ than the compressed acid gas stream 335. The first CO2 selective membrane permeate 571 is introduced to the second CO2 selective membrane 563. By allowing the $CO_2$ to permeate the second CO2 selective membrane 563, the waste gas stream 175 is generated. The waste gas stream 175 has a higher percentage of $CO_2$ than the first CO2 selective membrane permeate 571. A second CO2 selective membrane retentate 678 exits the retentate side of the second CO2 selective membrane 563. The second CO2 selective membrane retentate 678 contains a lower percentage of $CO_2$ than the first CO2 selective membrane permeate 571. The second CO2 selective membrane retentate 678 is recycled to the retentate side of the first CO2 selective membrane 561. Additional compression can be included in the mAGE unit 360 to increase the pressure of the streams and provide enough pressure for the membrane feed. Compression can be placed on the first CO2 selective membrane permeate 571.

Figure 7:
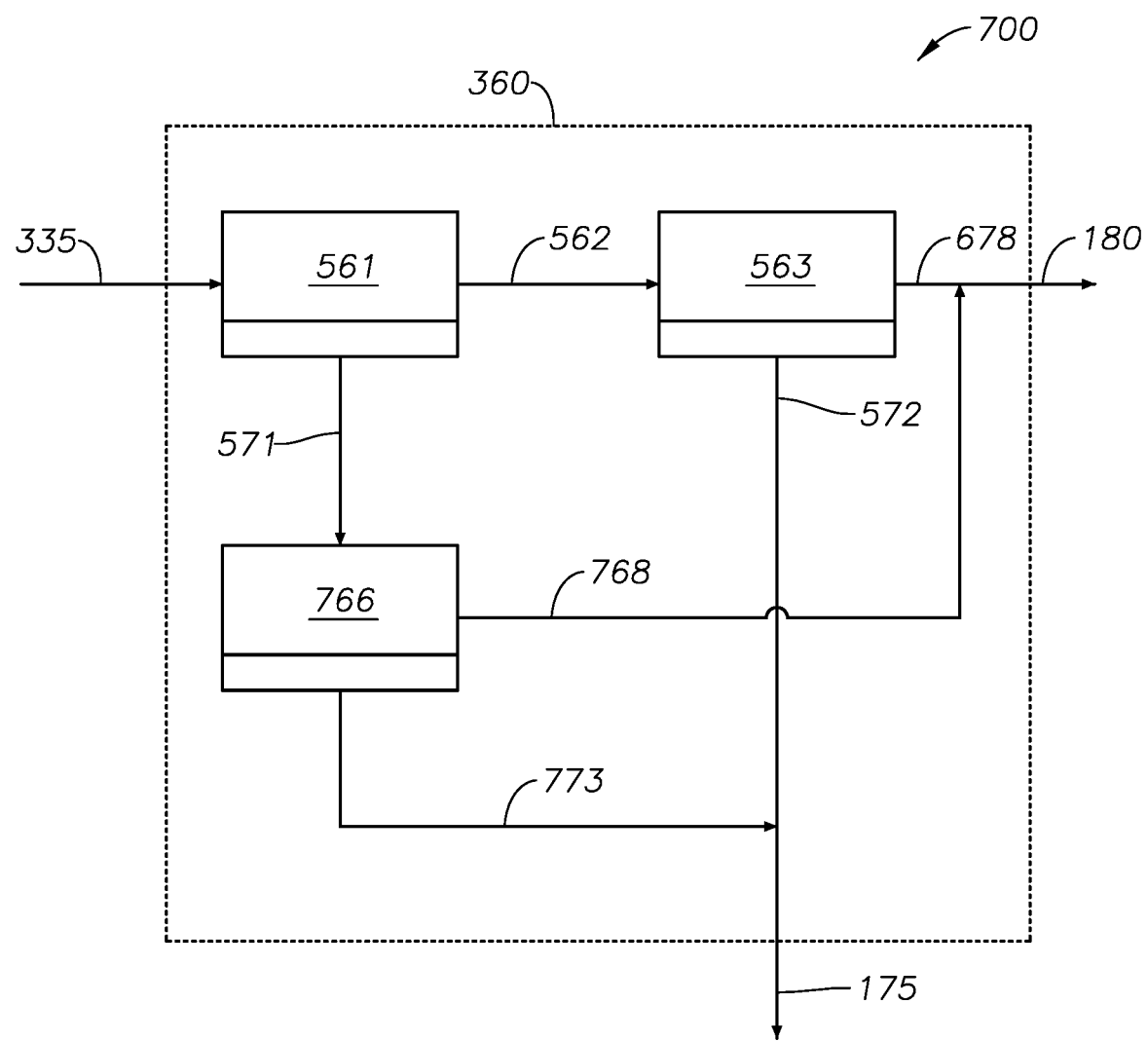
FIG. 7 is a block diagram of a mAGE unit with a two-step, two-stage membrane process, in accordance with another embodiment.

Referring now to FIG. 7, a block diagram is provided of the mAGE unit 360 with a two-step, two-stage membrane process 700, according to an embodiment described in this disclosure. Streams and units with the same number as depicted in FIGS. 1 through 6 have the same characteristics as streams and units with the corresponding number in FIG. 7. In an embodiment, the mAGE unit 360 includes the first CO2 selective membrane 561, the second CO2 selective membrane 563, and a third CO2 selective membrane 766. The first CO2 selective membrane 561, the second CO2 selective membrane 563, and the third CO2 selective membrane 766 used in the mAGE unit 360 can have the same characteristics as membranes discussed herein. In an embodiment, the first CO2 selective membrane 561, the second CO2 selective membrane 563, and the third CO2 selective membrane 766 are $CO_2$ over $H_2S$ selective membranes which selectively permeate $CO_2$ through the membrane over $H_2S$. In an embodiment, the compressed acid gas stream 335 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of $CO_2$ than the compressed acid gas stream 335. The first CO2 selective membrane retentate 562 exits the retentate side of the first CO2 selective membrane 561. The first CO2 selective membrane retentate 562 has a lower percentage of $CO_2$ than the compressed acid gas stream 335. The first CO2 selective membrane retentate 562 is introduced to the second CO2 selective membrane 563. By allowing the $CO_2$ to permeate the second CO2 selective membrane 563, the second CO2 selective membrane permeate 572 is generated. The second CO2 selective membrane permeate 572 has a higher percentage of $CO_2$ than the first CO2 selective membrane retentate 562. The second CO2 selective membrane retentate 678 exits the retentate side of the second CO2 selective membrane 563. The second CO2 selective membrane retentate 678 has a lower percentage of $CO_2$ than the first CO2 selective membrane retentate 562. The first CO2 selective membrane permeate 571 is introduced to the third CO2 selective membrane 766. By allowing the $CO_2$ to permeate the third CO2 selective membrane 766 a third CO2 selective membrane permeate 773 is generated. The third CO2 selective membrane permeate 773 has a higher percentage of $CO_2$ than the first CO2 selective membrane permeate 571. A third CO2 selective membrane retentate 768 exits the retentate side of the third CO2 selective membrane 766. The third CO2 selective membrane retentate 768 has a lower percentage of $CO_2$ than the first CO2 selective membrane permeate 571.

The second CO2 selective membrane retentate 678 can be combined with the third CO2 selective membrane retentate 768 to generate the enriched acid gas stream 180. Alternately, the second CO2 selective membrane retentate 678 can be recycled to the retentate side of the third CO2 selective membrane 766, such that the third CO2 selective retentate 768 generates the enriched acid gas stream 180. The second CO2 selective membrane permeate 572 can be combined with the third CO2 selective membrane permeate 773 to generate the waste gas stream 175. Additional compression can be included in the mAGE unit 360 to increase the pressure of the streams and provide enough pressure for the membrane feed. Compression can be placed on the first CO2 selective membrane permeate 571. Additional recycle streams can be included to improve efficiency.

Figure 8:
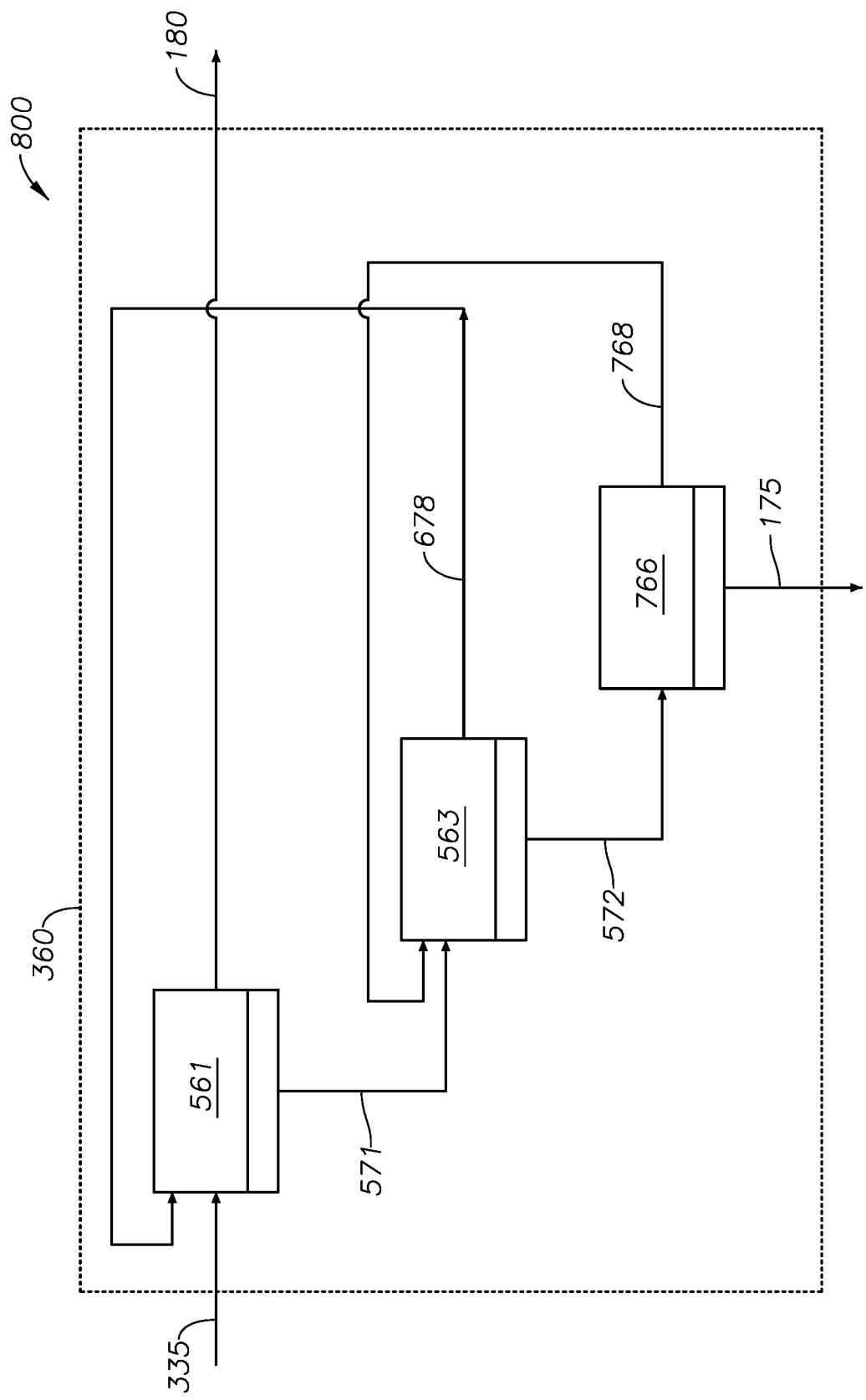
FIG. 8 is a block diagram of a mAGE unit with a three-stage membrane process, in accordance with another embodiment.

Referring now to FIG. 8, a block diagram is provided of the mAGE unit 360 with a three-stage membrane process 800, according to an embodiment described in this disclosure. Streams and units with the same number as depicted in FIGS. 1 through 7 have the same characteristics as streams and units with the corresponding number in FIG. 8. The mAGE unit 360 includes the first CO2 selective membrane 561, the second CO2 selective membrane 563, and the third CO2 selective membrane 766. The first CO2 selective membrane 561, the second CO2 selective membrane 563, and the third CO2 selective membrane 766 used in the mAGE unit 360 can have the same characteristics as membranes discussed herein. The first CO2 selective membrane 561, the second CO2 selective membrane 563, and the third CO2 selective membrane 766 are $CO_2$ over $H_2S$ selective membranes which selectively permeate $CO_2$ through the membrane over $H_2S$. The compressed acid gas stream 335 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of $CO_2$ than the compressed acid gas stream 335. The enriched acid gas stream 180 exits the retentate side of the first CO2 selective membrane 561. The enriched acid gas stream 180 has a lower percentage of $CO_2$ than the compressed acid gas stream 335. The first CO2 selective membrane permeate 571 is introduced to the second CO2 selective membrane 563. By allowing the CO₂ to permeate the second CO2 selective membrane 563, the second CO2 selective membrane permeate 572 is generated. The second CO2 selective membrane permeate 572 has a higher percentage of CO₂ than the first CO2 selective membrane retentate 562. The second CO2 selective membrane retentate 678 exits the second CO2 selective membrane 563. The second CO2 selective membrane retentate 678 has a lower percentage of CO₂ than the first CO2 selective membrane retentate 562. The second CO2 selective membrane retentate 678 is recycled to the first CO2 selective membrane 561. The second CO2 selective membrane permeate 572 is introduced to the third CO2 selective membrane 766. By allowing the CO₂ to permeate the third CO2 selective membrane 766, the enriched CO2 stream 175 is generated and removed from the permeate side of the third CO2 selective membrane 766. The enriched CO2 stream 175 has a higher percentage of CO₂ than the second CO2 selective membrane permeate 572. The third CO2 selective membrane retentate 768 is removed from the retentate side of the third CO2 selective membrane 766 and recycled to the retentate side of the second CO2 selective membrane 563. Additional compression can be included in the mAGE unit 360 to increase the pressure of the streams and provide enough pressure for the membrane feed.

Figure 9:
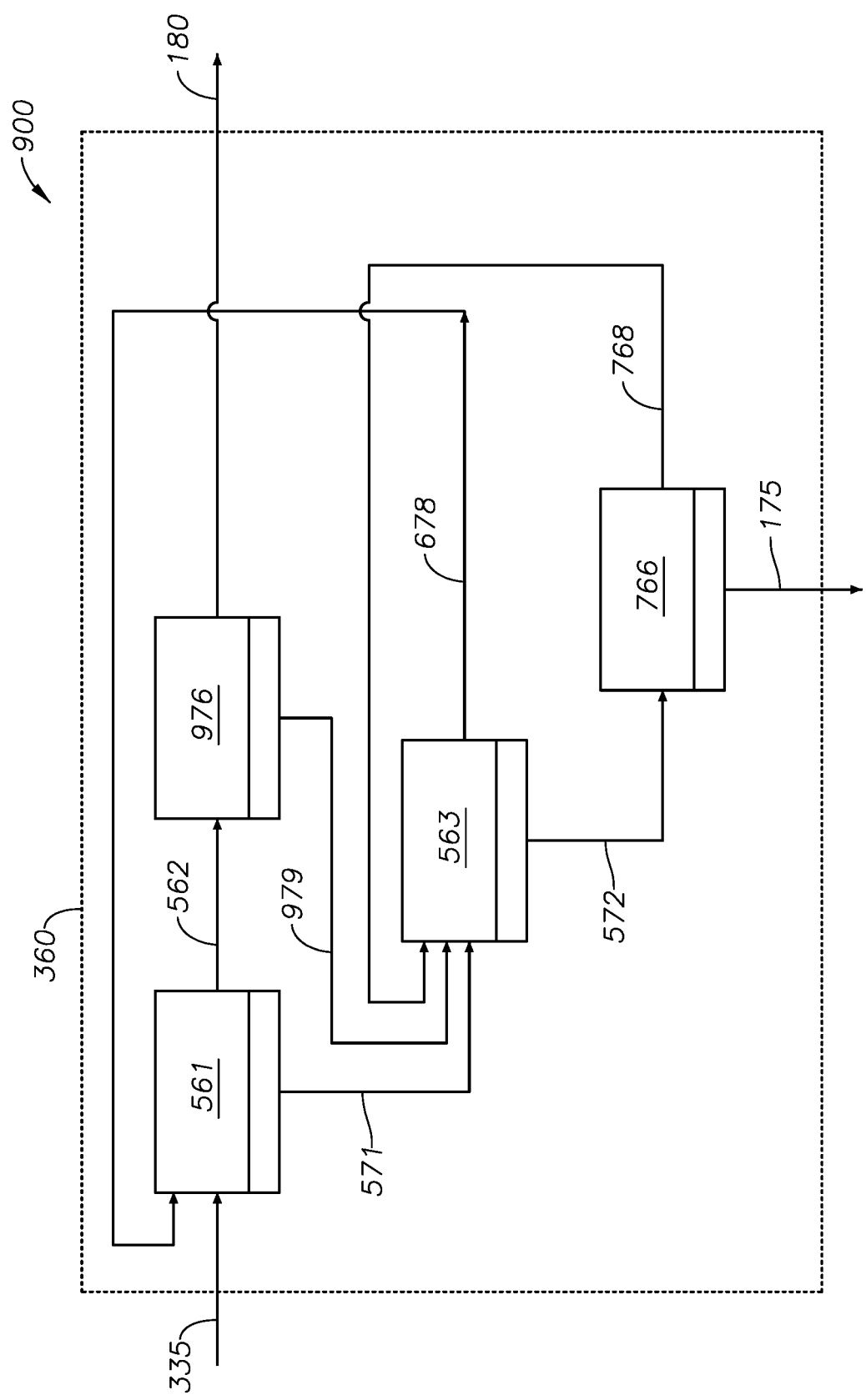
FIG. 9 is a block diagram of a mAGE unit with a two-step, three-stage membrane process, in according with another embodiment.

Referring now to FIG. 9, a block diagram is provided of the mAGE unit 360 with a two-step, three-stage membrane process 900, according to an embodiment described in this disclosure. Streams and units with the same number as depicted in FIGS. 1 through 8 have the same characteristics as streams and units with the corresponding number in FIG. 9. The mAGE unit 360 includes the first CO2 selective membrane 561, the second CO2 selective membrane 563, the third CO2 selective membrane 766, and a fourth CO2 selective membrane 976. The first CO2 selective membrane 561, the second CO2 selective membrane 563, the third CO2 selective membrane 766, and the fourth CO2 selective membrane 976 used in the mAGE unit 360 can have the same characteristics as membranes discussed herein. The first CO2 selective membrane 561, the second CO2 selective membrane 563, the third CO2 selective membrane 766, and the fourth CO2 selective membrane 976 are CO₂ over H₂S selective membranes which selectively permeate CO₂ through the membrane over H₂S. The compressed acid gas stream 335 is introduced to the first CO2 selective membrane 561. By allowing the CO₂ to permeate the first CO2 selective membrane 561, the first CO2 selective membrane permeate 571 is generated and removed from the permeate side of the first CO2 selective membrane 561. The first CO2 selective membrane permeate 571 has a higher percentage of CO₂ than the compressed acid gas stream 335. The first CO2 selective membrane retentate 562 exits the retentate side of the first CO2 selective membrane 561. The first CO2 selective membrane retentate 562 has a lower percentage of CO₂ than the compressed acid gas stream 335. The first CO2 selective membrane retentate 562 is introduced to the fourth CO2 selective membrane 976. By allowing the CO₂ to permeate the fourth CO2 selective membrane 976, the fourth CO2 selective membrane permeate 979 is generated and removed from the permeate side of the fourth CO2 selective membrane 976. The fourth CO2 selective membrane permeate 979 has a higher percentage of CO2 than the first CO2 selective membrane retentate 562. The enriched acid gas stream 180 exits the retentate side of the fourth CO2 selective membrane 976.

The first CO2 selective membrane permeate 571 and the fourth CO2 selective membrane permeate 979 is introduced to the second CO2 selective membrane 563. By allowing the CO₂ to permeate the second CO2 selective membrane 563, the second CO2 selective membrane permeate 572 is generated. The second CO2 selective membrane permeate 572 has a higher percentage of CO₂ than the first CO2 selective membrane retentate 562. The second CO2 selective membrane retentate 678 exits the second CO2 selective membrane 563. The second CO2 selective membrane retentate 678 has a lower percentage of CO2 than the first CO2 selective membrane retentate 562. The second CO2 selective membrane retentate 678 is recycled to the retentate side of the first CO2 selective membrane 561. The second CO2 selective membrane permeate 572 is introduced to the third CO2 selective membrane 766. By allowing the CO₂ to permeate the third CO2 selective membrane 766, the enriched CO2 stream 175 is generated and removed from the permeate side of the third CO2 selective membrane 766. The enriched CO2 stream 175 has a higher percentage of CO₂ than the second CO2 selective membrane permeate 572. The third CO2 selective membrane retentate 768 is removed from the retentate side of the third CO2 selective membrane 766 and recycled to the retentate side of the second CO2 selective membrane 563. Additional compression can be included in the mAGE unit 360 to increase the pressure of the streams and provide enough pressure for the membrane feed. Additional recycle streams can be included to improve efficiency.

Figure 10:
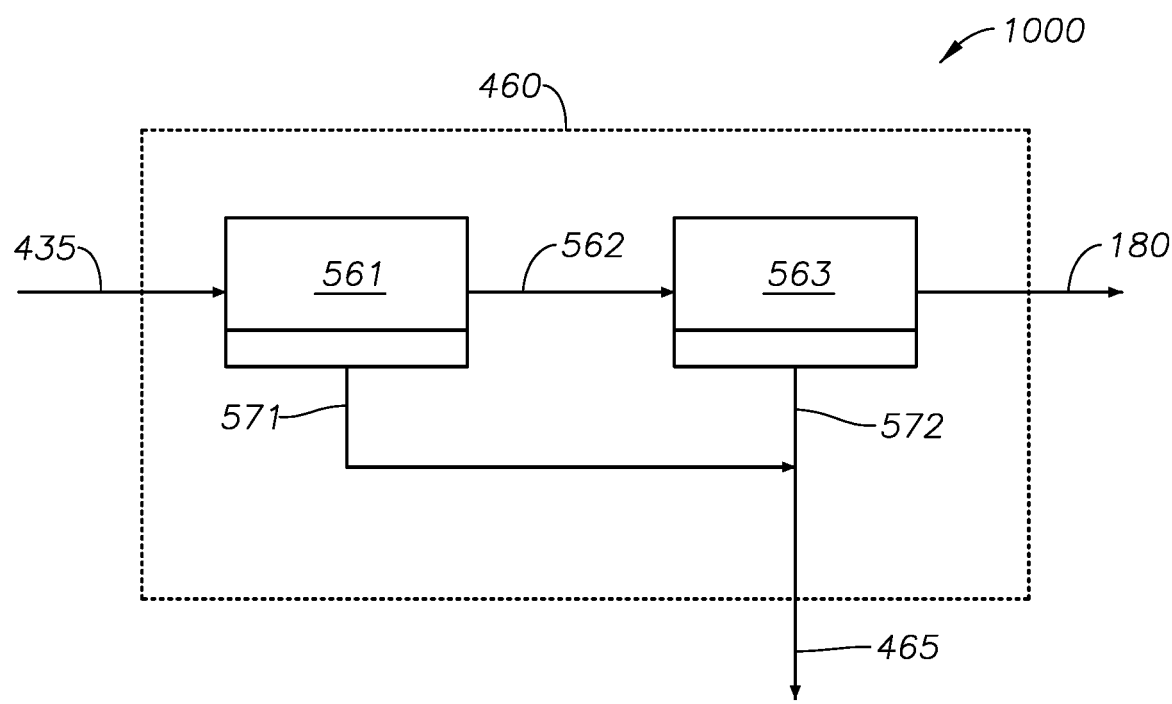
FIG. 10 is a block diagram of a hybrid mAGE unit with a two-step membrane process, in accordance with another embodiment.

Referring now to FIG. 10, a block diagram is provided of the hybrid mAGE unit 460 with a two-step membrane process 1000, according to an embodiment described in this disclosure. Streams and units with the same number as depicted in FIGS. 1 through 9 have the same characteristics as streams and units with the corresponding number in FIG. 10. In an embodiment, the hybrid mAGE unit 460 includes the first CO2 selective membrane 561 and the second CO2 selective membrane 563. The first CO2 selective membrane 561 and the second CO2 selective membrane 563 used in the hybrid mAGE unit 460 can have the same characteristics as membranes discussed herein. In an embodiment, the first CO2 selective membrane 561 and the second CO2 selective membrane 563 are CO₂ over H₂S selective membranes which selectively permeate CO₂ through the membrane over H₂S. In an embodiment, the compressed combined acid gas stream 435 is introduced to the first CO2 selective membrane 561. By allowing the CO₂ to permeate the first CO2 selective membrane 561, the first CO2 selective membrane permeate 571 is generated and removed from the permeate side of the first CO2 selective membrane 561. The first CO2 selective membrane permeate 571 has a higher percentage of CO₂ than the compressed combined acid gas stream 435. The first CO2 selective membrane retentate 562 exits the retentate side of the first CO2 selective membrane 561. The first CO2 selective membrane retentate 562 has a lower percentage of CO₂ than the compressed combined acid gas stream 435. The first CO2 selective membrane retentate 562 is introduced to the retentate side of the second CO2 selective membrane 563. By allowing the CO₂ to permeate the second CO2 selective membrane 563, the second CO2 selective membrane permeate 572 is generated and removed from the permeate side of the second CO2 selective membrane 563. The second CO2 selective membrane permeate 572 has a higher percentage of CO₂ than the first CO2 selective membrane retentate 562. The enriched acid gas stream 180 is removed from the retentate side of the second CO2 selective membrane 563. The enriched acid gas stream 180 has a lower concentration of CO2 than the first CO2 selective membrane retentate 562. The first CO2 selective membrane permeate 571 and the second CO2 selective membrane permeate 572 can be combined to form the feed CO2 stream 465. Alternately, the second CO2 selective membrane permeate 572 can be recycled to the retentate side of the first CO2 selective membrane 561, such that the first $CO_2$ selective membrane permeate 571 generates the feed CO2 stream 465. Additional compression can be included in the hybrid mAGE unit 460 to increase the pressure of the streams and provide enough pressure for the membrane feed. Additional recycle streams can be included to improve efficiency.

Figure 11:
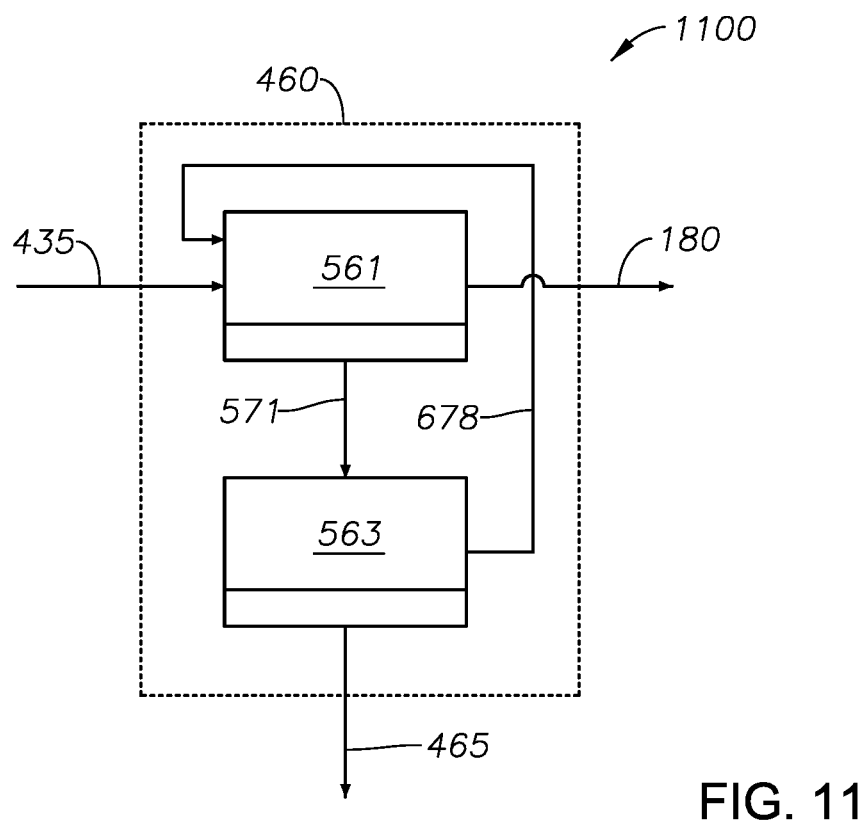
FIG. 11 is a block diagram of a hybrid mAGE unit with a two-stage membrane process, in accordance with another embodiment.

Referring now to FIG. 11, a block diagram is provided of the hybrid mAGE unit 460 with a two-stage membrane process 1000, according to an embodiment described in this disclosure. Streams and units with the same number as depicted in FIGS. 1 through 10 have the same characteristics as streams and units with the corresponding number in FIG. 11. In an embodiment, the hybrid mAGE unit 460 includes the first CO2 selective membrane 561 and the second CO2 selective membrane 563. The first CO2 selective membrane 561 and the second CO2 selective membrane 563 used in the hybrid mAGE unit 460 can have the same characteristics as membranes discussed herein. In an embodiment, the first CO2 selective membrane 561 and the second CO2 selective membrane 563 are $CO_2$ over $H_2S$ selective membranes which selectively permeate $CO_2$ through the membrane over $H_2S$. In an embodiment, the compressed combined acid gas stream 435 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of $CO_2$ than the compressed combined acid gas stream 435. The enriched acid gas stream 180 exits the retentate side of the first CO2 selective membrane 561. The enriched acid gas stream 180 has a lower percentage of $CO_2$ than the compressed combined acid gas stream 435. The first CO2 selective membrane permeate 571 is introduced to the second CO2 selective membrane 563. By allowing the $CO_2$ to permeate the second CO2 selective membrane 563, the feed CO2 stream 465 is generated. The feed CO2 stream 465 has a higher percentage of $CO_2$ than the first CO2 selective membrane permeate 571. The second CO2 selective membrane retentate 678 exits the retentate side of the second CO2 selective membrane 563. The second CO2 selective membrane retentate 678 has a lower percentage of $CO_2$ than the first CO2 selective membrane permeate 571. The second CO2 selective membrane retentate 678 is recycled to the retentate side of the first CO2 selective membrane 561. Additional compression can be included in the hybrid mAGE unit 460 to increase the pressure of the streams and provide enough pressure for the membrane feed. Compression can be placed on the first CO2 selective membrane permeate 571.

Figure 12:
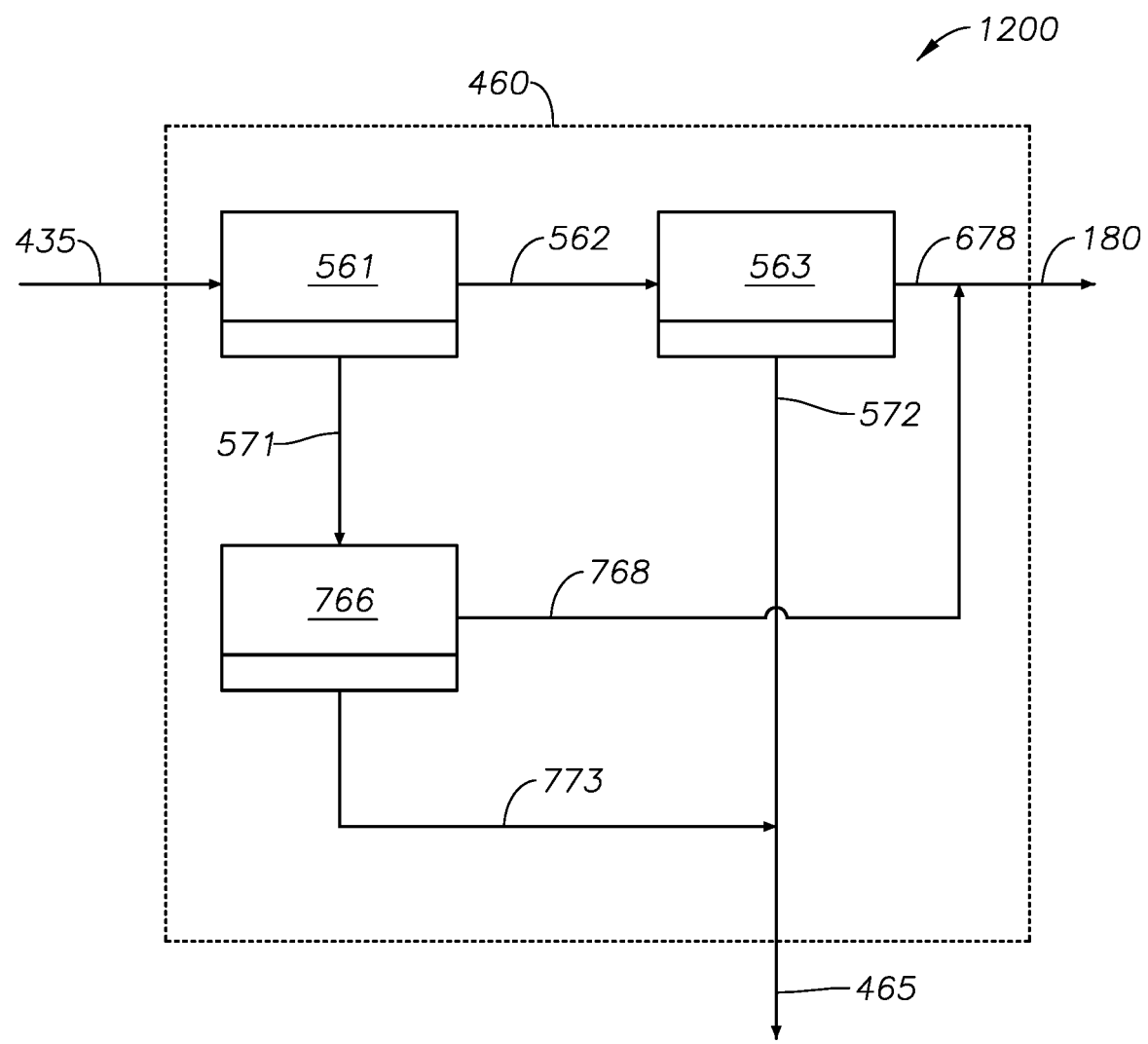
FIG. 12 is a block diagram of a hybrid mAGE unit with a two-step, two-stage membrane process, in accordance with another embodiment.

Referring now to FIG. 12, a block diagram is provided of the hybrid mAGE unit 460 with a two-step, two-stage membrane process 1200, according to an embodiment described in this disclosure. Streams and units with the same number as depicted in FIGS. 1 through 11 have the same characteristics as streams and units with the corresponding number in FIG. 12. In an embodiment, the hybrid mAGE unit 460 includes the first CO2 selective membrane 561, the second CO2 selective membrane 563, and a third CO2 selective membrane 766. The first CO2 selective membrane 561, the second CO2 selective membrane 563, and the third CO2 selective membrane 766 used in the hybrid mAGE unit 460 can have the same characteristics as membranes discussed herein. In an embodiment, the first CO2 selective membrane 561, the second CO2 selective membrane 563, and the third CO2 selective membrane 766 are $CO_2$ over $H_2S$ selective membranes which selectively permeate $CO_2$ through the membrane over $H_2S$. In an embodiment, the compressed combined acid gas stream 435 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of $CO_2$ than the compressed combined acid gas stream 435. The first CO2 selective membrane retentate 562 exits the retentate side of the first CO2 selective membrane 561. The first CO2 selective membrane retentate 562 has a lower percentage of $CO_2$ than the compressed combined acid gas stream 435. The first CO2 selective membrane retentate 562 is introduced to the second CO2 selective membrane 563. By allowing the $CO_2$ to permeate the second CO2 selective membrane 563, the second CO2 selective membrane permeate 572 is generated. The second CO2 selective membrane permeate 572 has a higher percentage of $CO_2$ than the first CO2 selective membrane retentate 562. The second CO2 selective membrane retentate 678 exits the retentate side of the second CO2 selective membrane 563. The second CO2 selective membrane retentate 678 has a lower percentage of $CO_2$ than the first CO2 selective membrane retentate 562. The first CO2 selective membrane permeate 571 is introduced to the third CO2 selective membrane 766. By allowing the $CO_2$ to permeate the third CO2 selective membrane 766, the third CO2 selective membrane permeate 773 is generated. The third CO2 selective membrane permeate 773 has a higher percentage of $CO_2$ than the first CO2 selective membrane permeate 571. The third CO2 selective membrane retentate 768 exits the retentate side of the third CO2 selective membrane 766. The third CO2 selective membrane retentate 768 has a lower percentage of $CO_2$ than the first CO2 selective membrane permeate 571.

The second CO2 selective membrane retentate 678 can be combined with the third CO2 selective membrane retentate 768 to generate the enriched acid gas stream 180. Alternately, the second CO2 selective membrane retentate 678 can be recycled to the retentate side of the third CO2 selective membrane 766, such that the third CO2 selective retentate 768 generates the enriched acid gas stream 180. The second CO2 selective membrane permeate 572 can be combined with the third $CO_2$ selective membrane permeate 773 to generate the feed CO2 stream 465. Additional compression can be included in the hybrid mAGE unit 460 to increase the pressure of the streams and provide enough pressure for the membrane feed. Compression can be placed on the first CO2 selective membrane permeate 571. Additional recycle streams can be included to improve efficiency.

Figure 13:
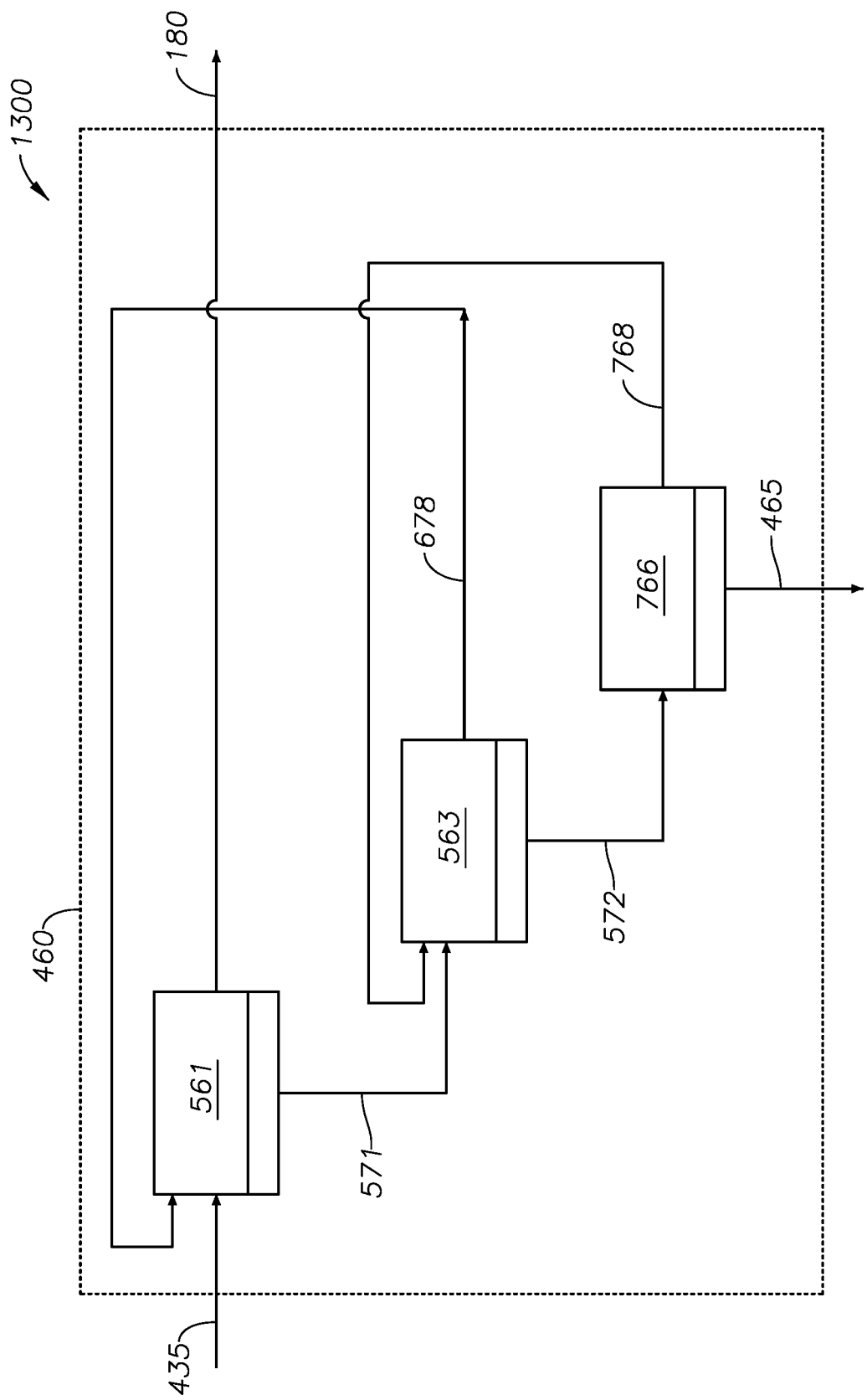
FIG. 13 is a block diagram of a hybrid mAGE unit with a three-stage membrane process, in accordance with another embodiment.

Referring now to FIG. 13, a block diagram is provided of the hybrid mAGE unit 460 with a three-stage membrane process 1300, according to an embodiment described in this disclosure. Streams and units with the same number as depicted in FIGS. 1 through 12 have the same characteristics as streams and units with the corresponding number in FIG. 13. In an embodiment, the hybrid mAGE unit 460 includes the first CO2 selective membrane 561, the second CO2 selective membrane 563, and the third CO2 selective membrane 766. The first CO2 selective membrane 561, the second CO2 selective membrane 563, and the third CO2 selective membrane 766 used in the hybrid mAGE unit 460 can have the same characteristics as membranes discussed herein. The first CO2 selective membrane 561, the second CO2 selective membrane 563, and the third CO2 selective membrane 766 are $CO_2$ over $H_2S$ selective membranes which selectively permeate $CO_2$ through the membrane over $H_2S$. The compressed combined acid gas stream 435 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of CO2 than the compressed combined acid gas stream 435. The enriched acid gas stream 180 exits the retentate side of the first CO2 selective membrane 561. The enriched acid gas stream 180 has a lower percentage of CO2 than the compressed combined acid gas stream 435. The first CO2 selective membrane permeate 571 is introduced to the second CO2 selective membrane 563. By allowing the $CO_2$ to permeate the second CO2 selective membrane 563, the second CO2 selective membrane permeate 572 is generated. The second CO2 selective membrane permeate 572 has a higher percentage of $CO_2$ than the first CO2 selective membrane retentate 562. The second CO2 selective membrane retentate 678 exits the retentate side of the second CO2 selective membrane 563 and is recycled to the retentate side of the first CO2 selective membrane 561. The second CO2 selective membrane retentate 678 has a lower percentage of $CO_2$ than first CO2 selective membrane permeate 571. The second CO2 selective membrane permeate 572 is introduced to the third CO2 selective membrane 766. By allowing the $CO_2$ to permeate the third CO2 selective membrane 766, the feed CO2 stream 465 is generated and removed from the permeate side of the third CO2 selective membrane 766. The feed CO2 stream 465 has a higher percentage of $CO_2$ than the second CO2 selective membrane permeate 572. The third CO2 selective membrane retentate 768 is removed from the retentate side of the third CO2 selective membrane 766 and is recycled to the retentate side of the second CO2 selective membrane 563. The third CO2 selective membrane retentate 768 has a lower percentage of $CO_2$ than the second CO2 selective membrane permeate 572.

Figure 14:
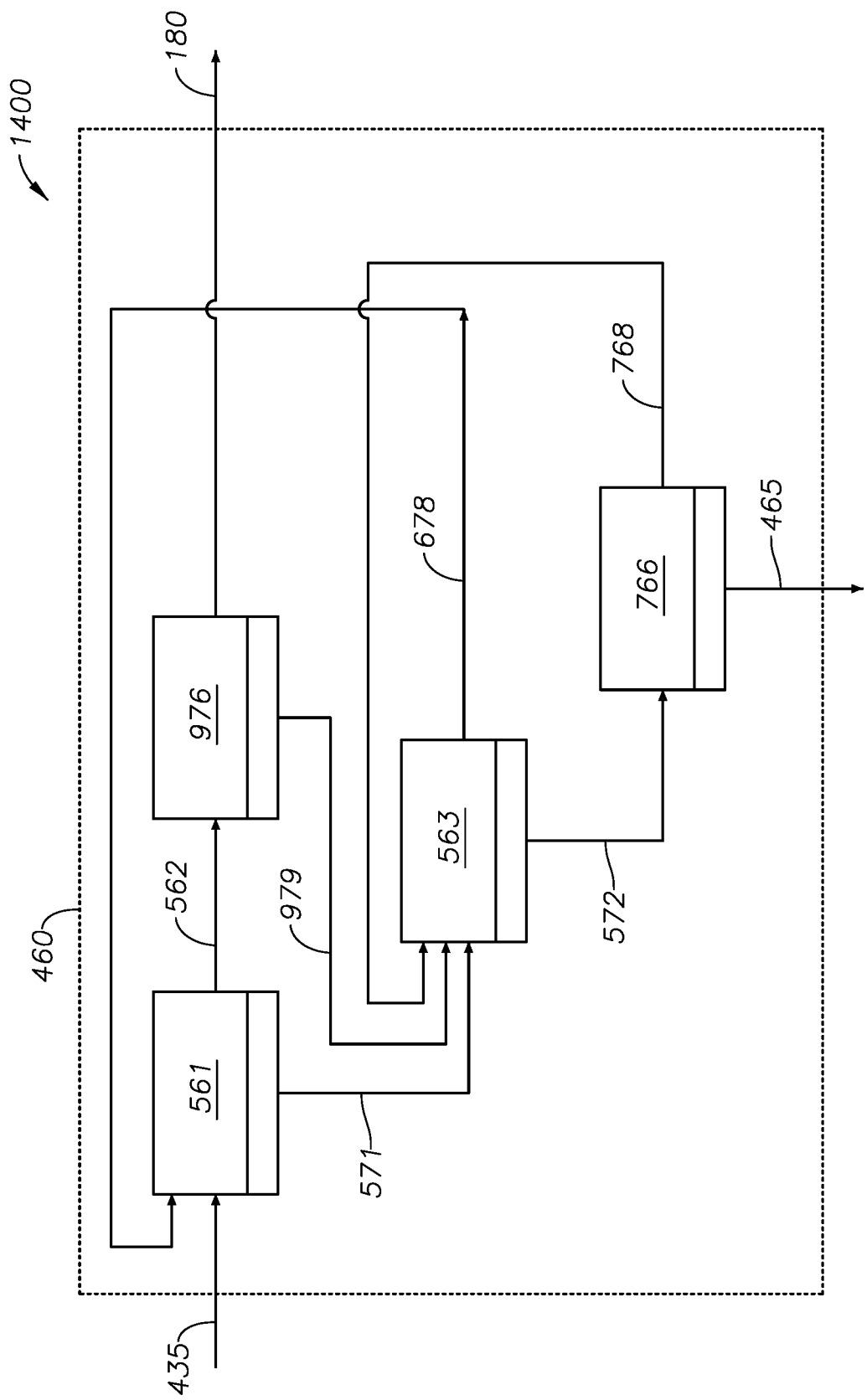
FIG. 14 is a block diagram of a hybrid mAGE unit with a two-step, three-stage membrane process, in according with another embodiment.

Referring now to FIG. 14, a block diagram is provided of a hybrid mAGE unit 360 with a two-step, three-stage membrane process 1400, according to an embodiment described in this disclosure. Streams and units with the same number as depicted in FIGS. 1 through 13 have the same characteristics as streams and units with the corresponding number in FIG. 14. The hybrid mAGE unit 460 includes the first CO2 selective membrane 561, the second CO2 selective membrane 563, the third CO2 selective membrane 766, and the fourth CO2 selective membrane 976. The first CO2 selective membrane 561, the second CO2 selective membrane 563, the third CO2 selective membrane 766, and the fourth CO2 selective membrane 976 used in the hybrid mAGE unit 460 can have the same characteristics as membranes discussed herein. The first CO2 selective membrane 561, the second CO2 selective membrane 563, the third CO2 selective membrane 766, and the fourth CO2 selective membrane 976 are $CO_2$ over $H_2S$ selective membranes which selectively permeate $CO_2$ through the membrane over $H_2S$. The compressed combined acid gas stream 435 is introduced to the first CO2 selective membrane 561. By allowing the $CO_2$ to permeate the first CO2 selective membrane 561, the first CO2 selective membrane permeate 571 is generated and removed from the permeate side of the first CO2 selective membrane 561. The first CO2 selective membrane permeate 571 has a higher percentage of $CO_2$ than the compressed combined acid gas stream 435. The first CO2 selective membrane retentate 562 exits the retentate side of the first CO2 selective membrane 561. The first CO2 selective membrane retentate 562 has a lower percentage of $CO_2$ than the compressed combined acid gas stream 435. The first CO2 selective membrane retentate 562 is introduced to the fourth CO2 selective membrane 976. By allowing the $CO_2$ to permeate the fourth CO2 selective membrane 976, the fourth CO2 selective membrane permeate 979 is generated and removed from the permeate side of the fourth CO2 selective membrane 976. The fourth CO2 selective membrane permeate 979 has a higher percentage of $CO_2$ than the first CO2 selective membrane retentate 562. The enriched acid gas stream 180 exits the retentate side of the fourth CO2 selective membrane 976.

The first CO2 selective membrane permeate 571 and the fourth CO2 selective membrane permeate 979 is introduced to the second CO2 selective membrane 563. By allowing the $CO_2$ to permeate the second CO2 selective membrane 563, the second CO2 selective membrane permeate 572 is generated. The second CO2 selective membrane permeate 572 has a higher percentage of $CO_2$ than the first CO2 selective membrane retentate 562. The second CO2 selective membrane retentate 678 exits the second CO2 selective membrane 563. The second CO2 selective membrane retentate 678 has a lower percentage of $CO_2$ than the first CO2 selective membrane retentate 562. The second CO2 selective membrane retentate 678 is recycled to the retentate side of the first CO2 selective membrane 561. The second CO2 selective membrane permeate 572 is introduced to the third CO2 selective membrane 766. By allowing the $CO_2$ to permeate the third CO2 selective membrane 766, the feed CO2 stream 465 is generated and removed from the permeate side of the third CO2 selective membrane 766. The feed CO2 stream 465 has a higher percentage of $CO_2$ than the second CO2 selective membrane permeate 572. The third CO2 selective membrane retentate 768 is removed from the retentate side of the third CO2 selective membrane 766 and recycled to the retentate side of the second CO2 selective membrane 563. Additional compression can be included in the mAGE unit 360 to increase the pressure of the streams and provide enough pressure for the membrane feed. Additional recycle streams can be included to improve efficiency.

EXAMPLES

Computer process simulations were performed to illustrate the operation and results of the acid gas enrichment units disclosed herein.

Example 1

In Example 1, five computer process simulations were performed of a sAGE unit installed as the acid gas enrichment unit. The sAGE unit utilized an $H_2S$ over $CO_2$ selective amine. The following compounds were used as the selective amine: Flexsorb SE™, 2-[2-(Diethylamino) ethoxy] ethanol (DEAE-EO); monoethylene glycol (MEG); N-tert-Butyldiethanolamine (t-BDEA); 2-Dipropylaminoethanol (DPAE); 3-Diethylamino-1-propanol (3DEA-1P); 2-Dimethylaminoethanol (DMAE); 2-(Diethylamino)ethanol (DEEA); 2-(Dibutylamino)ethanol (DBAE); 6-Dimethylamino-1-Hexanol (DMAH); Diisopropylamine (DIPA); 3-(Diethylamino)-1,2-propanediol (DEA-1,2-PD); N-Methyldiethanolamine (MDEA); Triethanolamine (TEA); N-tert- Butyldiethanolamine (t-BDEA); and triethylene glycol (TEG). FIG. 2 is a simplified depiction of the process layout used in the simulation. The waste gas stream 175 contained no more than 150 ppm $H_2S$. In the various simulations, the volume of the enriched acid gas reinjection stream 190 was reduced by a factor of 2 to 10 as compared to the volume of the acid gas stream 120.

Table 2A through Table 2E show the results of Simulation 1A through Simulation 1E, respectively.

TABLE 2A $CO_2$ Removal Using a sAGE Unit - Simulation 1A

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 2.5 | 22.5 |
| CO2 content (mol %) | 98 | 80 | 99.985 |
| H2S content (mol %) | 2 | 20 | 0.015 |

TABLE 2B $CO_2$ Removal Using a sAGE Unit - Simulation 1B

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 4.17 | 20.83 |
| CO2 content (mol %) | 95 | 70 | 99.985 |
| H2S content (mol %) | 5 | 30 | 0.015 |

TABLE 2C $CO_2$ Removal Using a sAGE Unit - Simulation 1C

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 6.25 | 18.75 |
| CO2 content (mol %) | 90 | 60 | 99.985 |
| H2S content (mol %) | 10 | 40 | 0.015 |

TABLE 2D $CO_2$ Removal Using a sAGE Unit - Simulation 1D

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 10 | 15 |
| CO2 content (mol %) | 80 | 50 | 99.985 |
| H2S content (mol %) | 20 | 50 | 0.015 |

TABLE 2E $CO_2$ Removal Using a sAGE Unit - Simulation 1E

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 12.5 | 12.5 |
| CO2 content (mol %) | 70 | 40 | 99.985 |
| H2S content (mol %) | 30 | 60 | 0.015 |

Table 2F shows the summary of the $H_2S$ content in the feed stream versus the enriched stream across Simulations 1A through 1E.

TABLE 2F $H_2S$ Content in Simulations of Example 1

| Simulation | $H_2S$ mol % in Acid Gas Stream 120 | $H_2S$ mol % in Enriched Acid Gas Reinjection Stream 190 |
|---|---|---|
| 1A | 2 | 20 |
| 1B | 5 | 30 |
| 1C | 10 | 40 |
| 1D | 20 | 50 |
| 1E | 30 | 60 |

Example 1 illustrates that use of an $H_2S$ over $CO_2$ selective amine is preferred when $H_2S$ content is low since final $H_2S$ content in the enriched acid gas stream 190 using a solvent is optimized when $H_2S$ content is lower (i.e., simulation 1A has an $H_2S$ content in the enriched acid gas stream 190 that is increased 10 fold as compared to the $H_2S$ content in the acid gas stream 120, while Simulation 1E has an $H_2S$ content in the enriched acid gas stream 190 that is increased only 2 fold as compared to the $H_2S$ content in the acid gas stream 120).

Example 2

In Example 2, computer process simulations were performed of a mAGE unit installed as the acid gas enrichment unit. The mAGE unit in the simulations utilized a $CO_2$ over $H_2S$ selective membrane. FIG. 3 is a simplified depiction of the process layout used in the simulation. The waste gas stream 175 contained no more than 150 ppm $H_2S$. In these simulations, the volume of the enriched acid gas reinjection stream 190 was reduced by a factor of 1.75 to 2 as compared to the acid gas stream 120.

Three simulations were performed to using different membrane stage selections and membrane selectivity values. Table 2A through Table 2C show the results of Simulation 2A through Simulation 2C, respectively.

TABLE 2A $CO_2$ Removal Using a mAGE Unit with 3 Stages and a Selectivity of 10 - Simulation 2A

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 12.53 | 12.47 |
| CO2 content (mol %) | 95 | 90.04 | 99.99 |
| H2S content (mol %) | 5 | 9.96 | 0.01 |

TABLE 2B $CO_2$ Removal Using a mAGE Unit with 2 Stages and a Selectivity of 20 - Simulation 2B

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 13.3 | 11.7 |
| CO2 content (mol %) | 90 | 81.22 | 99.985 |
| H2S content (mol %) | 10 | 18.78 | 0.015 |

TABLE 2C

CO$_2$ Removal Using a mAGE Unit with 3 Stages
and a Selectivity of 10 - Simulation 2C

| Stream Number | 120 | 190 | 175 |
|---|---|---|---|
| Temperature (° F.) | 100 | 120 | 100 |
| Pressure (psig) | 7 | 1500 | 7 |
| Flowrate (MMSCFD) | 25 | 14.1 | 10.9 |
| CO2 content (mol %) | 90 | 82.3 | 99.985 |
| H2S content (mol %) | 10 | 17.7 | 0.015 |

Example 3

In Example 3, computer simulations were performed of a hybrid acid gas enrichment system featuring a mAGE unit and a sAGE unit installed in series. In these simulations, the mAGE unit utilized a one stage $CO_2$ over $H_2S$ selective membrane set-up, as is shown in FIG. 4. In these simulations, the sAGE unit utilized an $H_2S$ over $CO_2$ selective amine. The type of amine used in Example 3 was the same type used in Example 1. FIG. 4 is a simplified depiction of the process layout used in the simulation. The waste gas stream 175 contained no more than 150 ppm $H_2S$. The volume of the enriched acid gas reinjection stream 190 was reduced by a factor of 2 to 2.5 as compared to the acid gas stream 120.

Three simulations were performed to using membrane selectivity values and acid gas stream 120 $H_2S$ content. Table 3A through Table 3C show the results of Simulation 3A through Simulation 3C, respectively.

TABLE 3A

CO$_2$ Removal Using a mAGE Unit with 1 Stage and a Selectivity
of 10, and a sAGE Unit - Simulation 3A

| Stream Number | 120 | 190 | 175 | 465 | 477 |
|---|---|---|---|---|---|
| Temperature (° F.) | 100 | 120 | 100 | 100 | 100 |
| Pressure (psig) | 7 | 1500 | 7 | 7 | 7 |
| Flowrate (MMSCFD) | 25 | 9.9 | 15.1 | 18.3 | 3.14 |
| CO2 content (mol %) | 80 | 50.6 | 99.985 | 94.5 | 68 |
| H2S content (mol %) | 20 | 49.4 | 0.015 | 5.5 | 32 |

TABLE 3B

CO$_2$ Removal Using a mAGE Unit with 1 Stage and a Selectivity
of 20, and a sAGE Unit - Simulation 3B

| Stream Number | 120 | 190 | 175 | 465 | 477 |
|---|---|---|---|---|---|
| Temperature (° F.) | 100 | 120 | 100 | 100 | 100 |
| Pressure (psig) | 7 | 1500 | 7 | 7 | 7 |
| Flowrate (MMSCFD) | 25 | 9.95 | 15.05 | 17.4 | 2.4 |
| CO2 content (mol %) | 80 | 50.3 | 99.985 | 97.3 | 80 |
| H2S content (mol %) | 20 | 49.7 | 0.015 | 2.7 | 20 |

TABLE 3C

CO$_2$ Removal Using a mAGE Unit with 1 Stage and a Selectivity
of 10, and a sAGE Unit - Simulation 3C

| Stream Number | 120 | 190 | 175 | 465 | 477 |
|---|---|---|---|---|---|
| Temperature (° F.) | 100 | 120 | 100 | 100 | 100 |
| Pressure (psig) | 7 | 1500 | 7 | 7 | 7 |
| Flowrate (MMSCFD) | 25 | 12.5 | 12.5 | 16.5 | 4.04 |
| CO2 content (mol %) | 70 | 40 | 99.985 | 91.5 | 65 |
| H2S content (mol %) | 30 | 60 | 0.015 | 8.5 | 35 |

The examples above indicate that for low $H_2S$ content, where the acid gas contains less than 10 mol % $H_2S$, a sAGE unit alone is preferred since it can more efficiently concentrate the $H_2S$.

For intermediate $H_2S$ content, where the acid gas contains more than 10 mol % $H_2S$ but less than 60 mol % $H_2S$, the hybrid approach of using a mAGE unit and a sAGE unit resulted in improvements and efficiencies, such as a reduction in size for the sAGE unit. The hybrid sAGE unit contactor size was 35% smaller based on a feed of 16.5 MMSCFD instead of 25 MMSCFD, the amine circulation rate was reduced due to the lower amount of $H_2S$ required to be removed from the membrane permeate, and the stripper duty was reduced by 3 (e.g., the stripped gas is 4.04 MMSCFD as compared to 12.5 MMSCFD as depicted in Table 2e and Table 4c).

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Ranges may be expressed throughout as from about one particular value, or to about another particular value. When such a range is expressed, it is to be understood that another embodiment is from the one particular value or to the other particular value, along with all combinations within said range.

What is claimed is:

1. A method of capturing sulfur compounds from an acid gas waste stream in an isolated field, the method comprising:
   introducing a gas stream to an acid gas removal unit, the gas stream comprising natural gas, carbon dioxide and hydrogen sulfide;
   separating the gas stream in the acid gas removal unit to produce an acid gas stream and a sweet gas stream, wherein the acid gas removal unit is operable to produce the sweet gas stream of quality for further processing or sale, wherein the sweet gas stream comprises natural gas and the acid gas stream comprises hydrogen sulfide and carbon dioxide;
   introducing the acid gas stream to an acid gas enrichment unit;
   separating the acid gas stream in the acid gas enrichment unit to produce an enriched acid gas stream and a waste gas stream, the waste gas stream comprising carbon dioxide and the enriched acid gas stream comprising hydrogen sulfide, and wherein the acid gas enrichment unit utilizes a removal process operable to selectively separate carbon dioxide and hydrogen sulfide in the acid gas stream;
   introducing the enriched acid gas stream to an enriched acid gas reinjection compressor;
   compressing the enriched acid gas stream in the enriched acid gas reinjection compressor to an operating pressure to generate an enriched acid gas reinjection stream, the operating pressure exceeding pressure of a reservoir; and injecting the enriched acid gas reinjection stream into the reservoir.

2. The method of claim 1, wherein the method of capturing sulfur compounds from an acid gas waste stream is performed in an absence of a sulfur removal unit.

3. The method of claim 1, wherein the method of capturing sulfur from an acid gas waste stream is performed in an absence of a thermal oxidizer.

4. The method of claim 1, wherein the waste gas stream comprises less than 150 ppm hydrogen sulfide.

5. The method of claim 1, further comprising the step of discharging the waste gas stream to atmosphere.

6. The method of claim 1, further comprising the step of introducing the waste gas stream to an enhanced oil recovery system.

7. The method of claim 1, wherein the acid gas removal unit is selected from the group consisting of an absorption process using a solvent, an absorption process using an absorbent, an adsorption process, a membrane unit, and combinations of the same.

8. The method of claim 1, further comprising the steps of:
combusting the waste gas stream in a combustion device to produce a combusted waste gas stream; and
discharging the combusted waste gas stream to atmosphere;
wherein the combustion device is selected from the group consisting of a waste gas heater, a flare, a thermal oxidizer, and combinations of the same.

9. The method of claim 1, wherein the enriched acid gas stream comprises at least 2 weight percent hydrogen sulfide.

10. The method of claim 1, wherein the enriched acid gas stream comprises at least weight percent hydrogen sulfide.

11. The method of claim 1, wherein the enriched acid gas stream comprises at least weight percent hydrogen sulfide.

12. The method of claim 1, wherein the enriched acid gas stream comprises at least weight percent hydrogen sulfide.

13. The method of claim 1, wherein the acid gas enrichment unit comprises a solvent acid gas enrichment (sAGE) unit operable to absorb hydrogen sulfide from the acid gas stream into a solvent.

14. The method of claim 1, wherein the acid gas enrichment unit comprises a membrane acid gas enrichment (mAGE) compressor and a mAGE unit, and further comprising the steps of:
compressing the acid gas stream with the mAGE compressor to produce a compressed acid gas stream; and
introducing the compressed acid gas stream to the mAGE unit.

15. The method of claim 1, wherein the acid gas enrichment unit comprises a hybrid membrane acid gas (mAGE) compressor, a hybrid mAGE unit, and a hybrid solvent acid gas enrichment (sAGE) unit, and further comprising the steps of:
introducing an enriched acid gas recycle to the acid gas stream to generate a combined acid gas stream;
compressing the combined acid gas stream with the hybrid mAGE compressor to produce a compressed combined acid gas stream;
introducing the compressed combined acid gas stream to the hybrid mAGE unit;
separating the compressed combined acid gas stream in the hybrid mAGE unit such that the hybrid mAGE unit produces a feed CO2 stream and the enriched acid gas stream;

introducing the feed CO2 stream to the hybrid sAGE unit, the hybrid sAGE unit operable to absorb hydrogen sulfide from the acid gas stream into a solvent; and
producing the enriched acid gas recycle and the waste gas stream from the hybrid sAGE unit by absorption and regeneration of the solvent.

16. The method of claim 14, wherein the mAGE unit comprises a membrane with a selectivity for carbon dioxide over hydrogen sulfide of greater than 5.

17. The method of claim 14, wherein the mAGE unit comprises a membrane with a selectivity for carbon dioxide over hydrogen sulfide of greater than 20.

18. The method of claim 14, wherein the mAGE unit comprises a membrane with a selectivity for carbon dioxide over hydrogen sulfide of greater than 30.

19. The method of claim 14, wherein the mAGE unit comprises a two-step membrane process.

20. The method of claim 14, wherein the mAGE unit comprises a two-stage membrane process.

21. The method of claim 14, wherein the mAGE unit comprises a two-step, two-stage membrane process.

22. The method of claim 14, wherein the mAGE unit comprises a three-step membrane process.

23. The method of claim 14, wherein the mAGE unit comprises a two-step, three-stage membrane process.

24. The method of claim 14, wherein the mAGE unit comprises a membrane comprising a selective layer comprising a perfluoropolymer.

25. The method of claim 24, wherein the perfluoropolymer is a monomer, copolymer, block copolymer, terpolymer, block terpolymer, or any molecular structure generated by a combination of monomers selected from the group of monomers consisting of: CYTOP™ polymer material; HYFLON™ polymer material; TEFLON™ polymer; TEFLON™ polymer AF2400; TEFLON™ polymer AF1400; TEFLON™ polymer AD60; TEFLON™ polymer AD80; perfluoro(2-methylene-4,5-dimethyl-1,3-dioxolane); perfluoro(2-methylene-1,3-dioxolane); perfluoro-2,2-dimethyl-1,3-dioxole (PDD); perfluoro-3-butenyl-vinyl ether (PBVE); Perfluoro(2-methylene-4-methyl-1,3-dioxolane) (PFMMD); and Perfluoro(2-methylene-1,3-dioxolane) (PFMD).

26. The method of claim 24, wherein the perfluoropolymer is a homopolymer, a copolymer, a block copolymer, a terpolymer, a block terpolymer, or any molecular structure generated by a combination of monomers selected from the group of monomers consisting of:

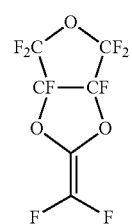

A

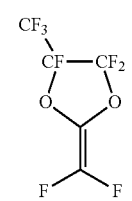

B

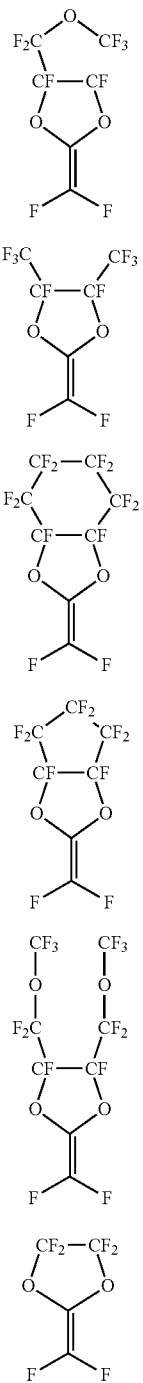

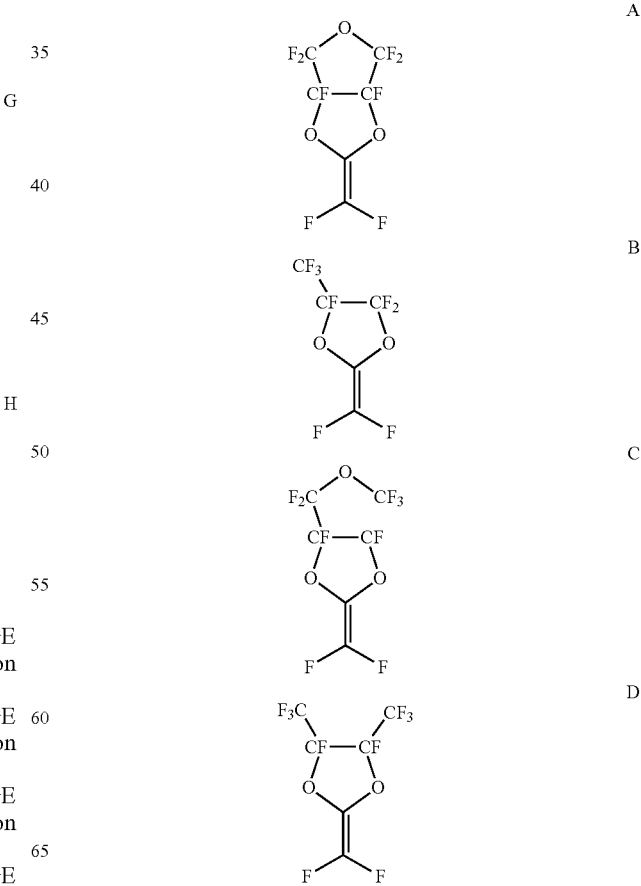

and combinations of the same.

27. The method of claim 15, wherein the hybrid mAGE unit comprises a membrane with a selectivity for carbon dioxide over hydrogen sulfide of greater than 5.

28. The method of claim 15, wherein the hybrid mAGE unit comprises a membrane with a selectivity for carbon dioxide over hydrogen sulfide of greater than 20.

29. The method of claim 15, wherein the hybrid mAGE unit comprises a membrane with a selectivity for carbon dioxide over hydrogen sulfide of greater than 30.

30. The method of claim 15, wherein the hybrid mAGE unit comprises a two-step membrane process.

31. The method of claim 15, wherein the hybrid mAGE unit comprises a two-stage membrane process.

32. The method of claim 15, wherein the hybrid mAGE unit comprises a two-step, two-stage membrane process.

33. The method of claim 15, wherein the hybrid mAGE unit comprises a three-stage membrane process.

34. The method of claim 15, wherein the hybrid mAGE unit comprises a two-step, three-stage membrane process.

35. The method of claim 15, wherein the hybrid mAGE unit comprises a membrane comprising a selective layer comprising a perfluoropolymer.

36. The method of claim 35, wherein the perfluoropolymer is a monomer, copolymer, block copolymer, terpolymer, block terpolymer, or any molecular structure generated by a combination of monomers selected from the group of monomers consisting of: CYTOP™ polymer material; HYFLON™ polymer material; TEFLON™ polymer; TEFLON™ polymer AF2400; TEFLON™ polymer AF1400; TEFLON™ polymer AD60; TEFLON™ polymer AD80; perfluoro(2-methylene-4,5-dimethyl-1,3-dioxolane); perfluoro(2-methylene-1,3-dioxolane); perfluoro-2,2-dimethyl-1,3-dioxole (PDD); perfluoro-3-butenyl-vinyl ether (PBVE); Perfluoro(2-methylene-4-methyl-1,3-dioxolane) (PFMMD); and Perfluoro(2-methylene-1,3-dioxolane) (PFMD).

37. The method of claim 35, wherein the perfluoropolymer is a homopolymer, a copolymer, a block copolymer, a terpolymer, a block terpolymer, or any molecular structure generated by a combination of monomers selected from the group of monomers consisting of:

-continued
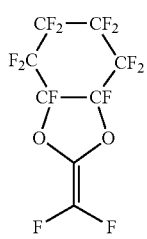
E
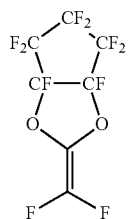
F
-continued
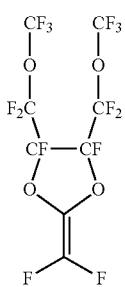
G
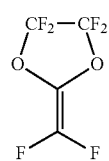
H
and combinations of the same.
* * * * *

UNITED STATES PATENT AND TRADEMARK OFFICE
CERTIFICATE OF CORRECTION

PATENT NO. : 11,851,625 B2
APPLICATION NO. : 17/326083
DATED : December 26, 2023
INVENTOR(S) : Vaidya et al.

It is certified that error appears in the above-identified patent and that said Letters Patent is hereby corrected as shown below:

In the Claims

Column 16, Claim 10, Lines 9-10:
"wherein the enriched acid gas stream comprises at least weight percent hydrogen sulfide."
Should be changed to:
--wherein the enriched acid gas stream comprises at least 10 weight percent hydrogen sulfide.--;

Column 17, Claim 11, Line 9:
"wherein the enriched acid gas stream comprises at least weight percent hydrogen sulfide."
Should be changed to:
--wherein the enriched acid gas stream comprises at least 50 weight percent hydrogen sulfide.--; and Column 19, Claim 12, Line 6:
"wherein the enriched acid gas stream comprises at least weight percent hydrogen sulfide."
Should be changed to:
--wherein the enriched acid gas stream comprises at least 60 weight percent hydrogen sulfide.--.

Signed and Sealed this
Thirteenth Day of February, 2024

Katherine Kelly Vidal
*Director of the United States Patent and Trademark Office*